(12) United States Patent
Antonio et al.

(10) Patent No.: US 9,361,877 B2
(45) Date of Patent: Jun. 7, 2016

(54) ULTRASONIC COMMUNICATION SYSTEM FOR COMMUNICATION THROUGH RF-IMPERVIOUS ENCLOSURES AND ABUTTED STRUCTURES

(71) Applicant: The Board of Regents of the University of Oklahoma, Norman, OK (US)

(72) Inventors: John K. Antonio, Norman, OK (US); Mark B. Yeary, Purcell, OK (US); Thomas D. Hosman, Edmond, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 647 days.

(21) Appl. No.: 13/664,275

(22) Filed: Oct. 30, 2012

(65) Prior Publication Data

US 2014/0119162 A1    May 1, 2014

Related U.S. Application Data

(63) Continuation of application No. PCT/US2011/034625, filed on Apr. 29, 2011.

(60) Provisional application No. 61/329,932, filed on Apr. 30, 2010.

(51) Int. Cl.
*G10K 11/00* (2006.01)
*G10K 11/24* (2006.01)
*H04B 11/00* (2006.01)

(52) U.S. Cl.
CPC .............. *G10K 11/24* (2013.01); *H04B 11/00* (2013.01)

(58) Field of Classification Search
CPC .............................. G10K 11/24; G08B 25/10
USPC ...................................... 166/242.1
See application file for complete search history.

(56) References Cited

U.S. PATENT DOCUMENTS

| | | | |
|---|---|---|---|
| 2007/0167133 A1* | 7/2007 | Tomlinson et al. | 455/39 |
| 2008/0020724 A1 | 1/2008 | Orrell et al. | |
| 2010/0090828 A1* | 4/2010 | Blanchard | 340/539.26 |
| 2011/0046903 A1* | 2/2011 | Franklin | 702/51 |
| 2011/0239680 A1* | 10/2011 | Dechene et al. | 62/259.2 |

FOREIGN PATENT DOCUMENTS

KR    10-2009-0034501    4/2009

OTHER PUBLICATIONS

Yahoo http://answers.yahoo.com/question/index?qid=20090519001202AAmQRqJ, May 19, 2009.*
Korean Intellectual Property Office, International Search Report regarding PCT/US2011/034625, dated Nov. 16, 2011.
Korean Intellectual Property Office, Written Opinion regarding PCT/US2011/034625, dated Nov. 16, 2011.

* cited by examiner

*Primary Examiner* — Luke Ratcliffe
*Assistant Examiner* — Hovhannes Baghdasaryan
(74) *Attorney, Agent, or Firm* — Dunlap Codding, P.C.

(57) ABSTRACT

An ultrasonic communication system comprising an enclosure, a first module and a second module is described. The enclosure has an internal surface, an external surface, and defines at least one metal channel. The first module comprises an ultrasonic transceiver disposed within the enclosure. The first module is positioned on the internal surface of the enclosure and is capable of transmitting and/or receiving modulated ultrasonic waves via the metal channel. The second module is positioned on the external surface of the enclosure and is adapted to transmit and/or receive modulated ultrasonic waves from the first module via the metal channel.

8 Claims, 26 Drawing Sheets

ULTRASONIC COMMUNICATION SYSTEM FOR COMMUNICATION THROUGH RF-IMPERVIOUS ENCLOSURES AND ABUTTED STRUCTURES

CROSS-REFERENCE TO RELATED APPLICATIONS

This application claims the benefit of the PCT Application No. PCT/US11/34625, filed Apr. 29, 2011, which claims the benefit of U.S. Provisional Application No. 61/329,932, filed Apr. 30, 2010, both of which are incorporated herein by reference in their entirety.

STATEMENT REGARDING FEDERALLY SPONSORED RESEARCH OR DEVELOPMENT

This invention was made with government support under SAFTEA-LU 1934 and SAFTEA-LU 1702 awarded by the Federal Highway Administration. The government has certain rights in the invention.

BACKGROUND

Wireless radio frequency (RF) communication networks are becoming ubiquitous. Furthermore, the number of devices being connected to wireless networks is growing at a tremendous rate, as the diversity of types of wireless devices being deployed is also increasing. Devices having wireless RF interfaces range from tiny sensors deployed in rain forests (e.g., to track environmental conditions over time), to smart phones, to laptop computers, to RFID tags for tracking products shipped around the world. As more and more applications of wireless network technologies emerge, so too do situations where wireless connections and networks are needed, but for which wireless RF transmission is not possible. The inventive concept describes a wireless ultrasonic communication system that enables communication into and out of RF-impervious enclosures and structures.

Applications of wireless networks that require connections to devices that may reside inside RF-impervious enclosures, including metal enclosures, are of increasing importance. One example application where this occurs is in the tracking of products and/or environmental conditions inside a sealed steel shipping container. For reasons involving security and privacy, the doors of shipping containers in transit cannot be opened. Furthermore, holes or similar modifications may not be made to these standardized shipping containers for reasons of structural integrity and security, and protection of the items within the sealed shipping container.

Much international shipping is carried in standardized shipping containers, which can be transferred by ship, truck, or rail. It is of great importance to both shippers and security professionals to gather information about the contents, location, and environmental conditions within such shipping containers. Inspecting and tracking the contents of stacked shipping containers in transit is problematic. In a shipyard, only the doors of some shipping containers at the bottom of a stack may be accessed. In a container ship, almost none of the shipping container doors are accessible. Even when accessing the door of a shipping container is possible, opening a shipping container door that is in transit may violate international security policy and regulations.

The inside of shipping containers can be equipped with electronic devices capable of storing and collecting a variety of data. For example, an electronic file containing the contents of a shipping container can be stored on a device within a shipping container. Furthermore, environmental conditions such as temperature and acceleration can be measured with sensors, and stored electronically within a shipping container. Standard wireless radio frequency (RF) communication technology cannot be used to retrieve data from a closed shipping container because RF transmissions cannot penetrate the metal surfaces of a shipping container. RF signals are reflected by metal surfaces analogous to the way light is reflected by mirrors. As a result, transmitting digital information using RF networking technology is not possible when attempting to transmit through and/or around stacks of shipping containers. Boring holes in a shipping container for the purpose of establishing direct wired connections to electronic data inside a shipping container is not feasible because such interfaces are not standard and would be difficult to maintain/ operate if there ever became such a standard. Furthermore, doing so would generally compromise the structural integrity of the shipping container and alter the standardized structure. The inability to read electronic information stored inside the shipping container (e.g., RFIDs, sensor readings, electronically stored manifests) severely limits the efficiency and effectiveness of security professionals and inspectors in performing their duties. It also limits the ability of commercial shipping companies in tracking and monitoring the status of packages inside shipping containers in transit, as well as monitoring the environmental conditions inside a shipping container.

Some shipping containers are not entirely constructed of metal. For example, a floor of shipping container is provided with metal joists, but may have a plywood bottom. Even though RF transmissions may pass through plywood material, significant problems exist when trying to communicate to the interior of the shipping container using RF transmissions. This is because the bottom of the shipping container is typically shielded by a top metallic surface of an adjacent shipping container upon which it is stacked, or a ground plane (such as the Earth, or a metallic floor of a ship) upon which the shipping container is positioned.

Shipping containers are typically twenty or forty feet long, eight feet wide, and eight and one-half feet tall. They are constructed with four structural steel corner posts terminated at the top and the bottom in cast steel corner blocks. Shipping containers can be stacked up to twelve high, resulting in a towering structure the height of a ten story building. Expansive grids of stacked shipping containers are commonly found in shipyards and deep within the hulls of huge container ships. Shipping containers are positioned and stacked with massive, precision cranes. To make efficient use of limited space, adjacent stacks of shipping containers are typically positioned very close together in shipyards. On container ships, adjacent stacks of shipping containers are often placed in contact with one another and/or held in place with locking pins and/or bracing straps to provide stability. When stacked, the weight of the shipping containers and their cargo is carried by the continuous columns of corner posts at each corner of the stack. For structural and security reasons, the doors of a shipping container must not be opened in transit, and holes may not be drilled through a shipping container's walls.

Closed shipping containers act as Faraday cages, which preclude the use of traditional radio frequency (RF) communication schemes for transmitting data through these metal structures. Traditional radio frequency communication schemes are not capable of transmitting signals through metal enclosures. Ultrasound presents a promising alternative. Steel is an excellent conduit of ultrasonic energy, and ultrasound transmission requires no compromise of the shipping container's structural or security integrity.

Previous researchers have investigated ultrasonic communication in other applications. A patent application [1] exists, for example, for an application involving sensor communication within an airframe; sensor communication along the surface of a single shipping container is also mentioned. However, this prior research: (i) does not consider communication from within a shipping container to outside a shipping container; (ii) does not consider communication among stacked shipping containers; (iii) does not consider two way communication; and (iv) did not proceed to the system prototyping stage.

Research was done at Oak Ridge National Laboratories in 1993 and further in 1999 regarding ultrasonic communications [2]. These researchers successfully built a demonstration system to communicate using ultrasound in air, and also carried out experiments in various types of pipes that might be found in a typical building water supply. The demonstration system built as part of this project consisted of three work boxes and a laptop running LabView Virtual Instruments at each end of the communication channel.

Other research on underwater communication with autonomous underwater vehicles (AUVs) was conducted at Florida Atlantic University in 1996 [3]. Their research involved using multi-tone frequency shift keying (MFSK) and differential phase shift keying (DPSK) to communicate in shallow water.

The most mature applications involving ultrasonics do not involve ultrasonic communications, but instead originate from the fields of non-destructive testing and medical imaging. In nondestructive testing, the propagation of high frequency (several MHz) ultrasound is transmitted through various materials for the detection of material discontinuities such as flaws or cracks [4]. In medical applications, ultrasonic reflections are the basis of forming images. Although there is an extensive body of data related to these types of applications, the high-frequency (and high-resolution) transducers designed to operate in these regimes are costly, and therefore may be impractical for the types of application domains where ultrasonic communications would be employed.

Another application involving the problem of transmitting information through an RF-impervious enclosure arises in oil and gas applications, including downhole drilling and extraction. For reasons involving human and environmental safety and protection, and prevention of damage to various components of the drilling rig, it is important to monitor pressure, and possibly other parameters, such as temperature, using sensors located inside highly pressurized vessels and enclosures, including blowout preventers (BOPs). These highly pressurized enclosures are enormous in size, typically constructed with extremely thick, strong steel components. Due to the extreme conditions and pressures present inside these enclosures, it is not possible or practical to consider boring holes through the walls of these structures with the purpose of passing wiring for making connections between the inside and outside of the enclosure.

In the field of oil and gas exploration and extraction, for reasons of human and environmental safety and prevention of damage to components of the rig, it is increasingly desirable to be able to monitor pressure and/or other sensor readings taken from within the enclosure associated with a blowout preventer (BOP) or a BOP stack. The goal is to transmit pressure measurement readings taken inside a BOP enclosure (or other associated enclosure and/or pipe) to outside the BOP without compromising the structural integrity of the BOP itself (e.g., without boring holes in the thick steel walls of the structure). Pressures can be upwards of 20,000 pounds per square inch (psi), thus failures of the mechanical structure of the BOP can be catastrophic and must be prevented. Transmitting electronic measurements taken from the inside of a pressurized component, such as a BOP, to the outside, is not possible with RF, because RF does not transmit through steel. Also, it is not possible to use a "wired connection" to transmit the readings of a sensor on the inside of the BOP to the outside, because it is not allowed to bore a hole through a wall of the BOP; doing so would compromise its structural integrity and ability of the BOP to withhold extremely high pressures.

The valve(s) of a BOP are closed, either manually or automatically, in order to prevent extremely high-pressure well fluids from blowing out of the well rig, which could otherwise harm the well operators and/or compromise or destroy the rig itself. Thus, it is important to accurately monitor the pressure the BOP is withstanding. One type of BOP, called an annular type, stops the flow of fluids out of the annulus, which is the area between the outside of the drill pipe and the casing of the wellbore. By pumping dense mud into the wellbore, down the drill string, downhole pressure can be overcome. Having accurate measurements of pressures within the BOP would enable operators to know the density of mud that should be used to kill the well and/or know at what point the pressures are safe for possible continued operation or drilling. Having accurate measurements of pressures is also important during testing and maintenance phases of the BOP lifecycle. The requirement of measuring extremely high pressures remains; whether they occur in operation in the field, or in a controlled testing environment. The inventive concept described enables ultrasonic communication mechanisms to transmit pressure readings (and/or other sensor readings) from an ultrasonic communication module mounted on the inside of the BOP, through its thick steel wall, to a receiving module mounted on the outside of the BOP. Once the sensor measurement reading is available on the outside of the BOP, it can be transmitted from the externally mounted module to the desired final destination using traditional (e.g., wired or RF) or ultrasonic communication channels, as appropriate.

In addition to measuring pressures from within a single BOP, the inventive concept also addresses the requirement of communicating pressure readings among BOPs forming a BOP stack. A BOP stack is a structure of two or more BOPs used to control pressure in a well. A typical stack may have different types of BOPs, e.g., annular types at the top and ram types near the bottom of the stack. Communication of pressure readings among a stack of BOPs provides the ability to implement automatic control mechanisms in which pressure readings from all BOPs can be considered in making timely control and actuation decisions. Additionally, ultrasonic communication modules residing on multiple BOPs of a stack can form a relay network for communicating information measured at one location of the stack to another location on the stack, which may serve as a communication gateway for communicating to other components of the rig or locations where operators of the rig can monitor pressure readings and take necessary action.

Accordingly, a need exists in the prior art to obtain information from inside sealed RF-impermeable enclosures, without compromising the enclosure's integrity. To such systems and methods for transmitting information through RF-impermeable sealed enclosures the inventive concept disclosed herein is directed.

SUMMARY

In one aspect the inventive concept disclosed herein is directed to an ultrasonic communication system. The ultrasonic communication system is provided with an enclosure, a first module and a second module. The enclosure has an internal surface, an external surface, and defines at least one metal channel. The first module comprises an ultrasonic transceiver disposed within the enclosure. The first module is positioned on the internal surface of the enclosure and is capable of transmitting and/or receiving modulated ultrasonic waves via the metal channel. The second module is positioned on the external surface of the enclosure and is adapted to transmit and/or receive modulated ultrasonic waves from the first module via the metal channel.

In another aspect, the inventive concept disclosed herein is directed to an ultrasonic communication system, comprising a first enclosure defining one or more first channels capable of transmitting modulated ultrasonic waves and one or more first modules comprising an ultrasonic transceiver positioned onto the first channel. A second enclosure defines one or more second channels capable of transmitting modulated ultrasonic waves and has one or more second modules comprising an ultrasonic transceiver positioned onto the second channel. The first enclosure and the second enclosure are positioned in an abutting interface connecting the first channel and the second channel such that the first module and the second module communicate via the first and second channels.

In yet another aspect, the inventive concept disclosed herein is directed to a method of forming an ultrasonic communication system comprising the steps of: (a) positioning a first module onto an internal surface of an enclosure, the enclosure being impermeable to radio frequency waves, the first module capable of transmitting an ultrasonic modulated wave to an external surface of the enclosure; (b) positioning a second module onto an external surface of the enclosure, the second module capable of receiving and/or transmitting modulated ultrasonic waves from/to the first module.

BRIEF DESCRIPTION OF THE SEVERAL VIEWS OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION

Figure 1:
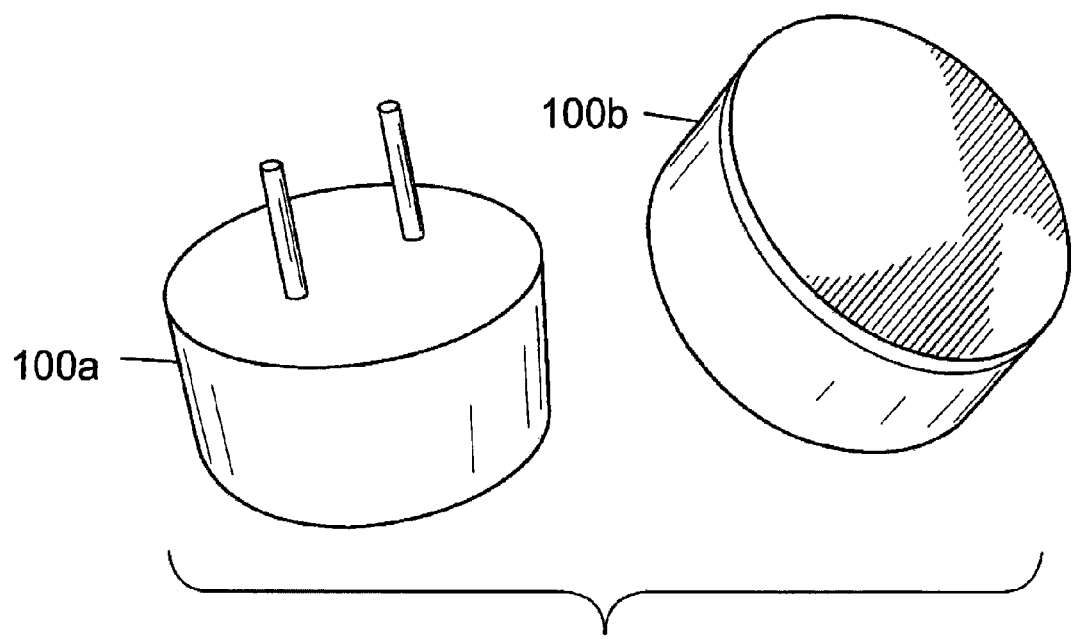
FIG. 1 shows an exemplary embodiment of ultrasonic transducers according to the instant disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the disclosure, numerous specific details are set forth in order to provide a more thorough understanding of the inventive concept. However, it will be apparent to one of ordinary skill in the art that the inventive concept within the disclosure may be practiced without these specific details. In other instances, well-known features have not been described in detail to avoid unnecessarily complicating the instant disclosure.

A conformal ultrasonic communication system based on multi-tone FSK (MFSK) has been developed and evaluated using steel corner posts from shipping containers as the communication medium. The ultrasonic communication system is configurable, consisting of two or more modules with one of the modules being an inside module and the other being an outside module. However, as discussed in more detail below, it should be understood that the inside and outside modules do not have to be located on the same container or enclosure, or even on the same stack of shipping containers or enclosures so long as at least one inside module can communicate with at least one outside module.

As used herein, the term "metal channel" or simply "channel" shall be understood to mean a metal of an enclosure, including the structural corner posts for the shipping container application, which is used as the ultrasonic communication medium.

The term "module" will be used when referring to the operation of the inside module and the outside module. The modules are mounted to metal surface(s) forming a metal channel and preferably utilize ultrasonic transducers to send and receive modulated signals through the metal channel. The modules may also make use of a controller having an inexpensive digital signal processor (DSP) chip for modulating and demodulating MFSK signals. For the shipping container application, experiments were conducted that achieve data rates of approximately 800 bytes-per-second (bps). Experiments related to two scenarios for the shipping container application were investigated: (1) communicating through one shipping container and (2) communication between stacked shipping containers. For the second case, experiments were conducted with modules on two separate corner posts that are under compressive load. This demonstrates the ability to establish ultrasonic communication among arrays of shipping containers that are abutted with patterns of contact.

The presently disclosed and claimed inventive concept(s) focus on the development and logistical implications of an ultrasonic communication system that may employ the coupled metal components of stacked shipping containers or pressurized enclosures as ultrasound communication conduits. More particularly, the inventive concept disclosed herein describes an ultrasonic communication solution in which the structure of the enclosure itself serves as the communication channel for ultrasonic signaling. This approach enables a wireless connection to be made between the inside and outside of a sealed, RF-impervious enclosure. The most basic architecture of the ultrasonic communication system includes at least two ultrasonic-based communication modules, one mounted to a surface inside the enclosure and the other mounted on the outside surface of the enclosure. Sensors and sensor readings and/or other stored electronic information may be co-located with a module mounted on the inside of the enclosure. Alternatively, sensors and sensor readings and/or other stored electronic information may be stored at different locations inside the enclosure and be transmitted to the module mounted inside the enclosure using any number of communication schemes and mediums. In the described inventive concept, data present on the module mounted inside the enclosure is encoded, modulated, and transmitted using ultrasonic signaling into the enclosure structure using an ultrasonic transducer held in contact with the inside surface of the enclosure. A module in contact with a surface on the outside of the enclosure receives the transmitted ultrasonic signals, which are then demodulated and decoded to reconstruct the originally transmitted information.

Another, more advanced ultrasonic communication architecture involves mounting ultrasonic communication modules on two or more RF-impervious enclosures, or structures, which are abutted to one another. In this architecture, two or more modules can participate in a relay network by using the aggregate structure(s) formed by the abutment of the enclosures, or structures, as ultrasonic communication channel(s). Example scenarios where the utility of this type of architecture arises include stacks of shipping containers and BOP stacks.

The conformal modules of this communication system establish two-way communication and are capable of participating in a relay network within a stack of shipping containers or pressurized enclosures or even a collection of stacks of shipping containers or pressurized enclosures in which one or more shipping containers in adjacent stacks are either directly in contact or indirectly in contact through accessory metal structures such as bracings.

The presently disclosed and claimed inventive concept(s) utilizes the coupled metal structures of stacked shipping containers or pressurized enclosures as ultrasound communication conduits through which data is communicated through modulated ultrasonic signals. A stack of shipping containers or pressurized enclosures forms a communication network in which shipping containers or pressurized enclosures on the stack contain communication modules (ultrasonic receiver/transmitter pairs) used to initiate, relay, and/or respond to communications signals to/from abutted shipping containers or BOPs, or shipping containers or pressurized enclosures that are connected indirectly.

In one version, the presently disclosed and claimed inventive concept(s) describes an ultrasonic communication system that employs the coupled metal components of stacked shipping containers as ultrasound communication conduits. To read the contents of data inside one or more shipping containers in a stack, an operator need only make contact with one external shipping container surface in the stack using an ultrasonic coupler. Once contact is made, the contents of the shipping containers can be queried by the operator. Also, the operator can send control signals to selected shipping containers (e.g., to adjust environmental control settings such as temperature and humidity). A stack of shipping containers effectively forms a communication network, enabling the operator access/control data of all shipping containers in the stack via one external access point on one shipping container.

The presently disclosed and claimed inventive concept(s) can revolutionize the tracking, security, and quality control of shipping container's contents. Allowing shipping containers to be opened and examined while in transit is not possible in practice due to general inaccessibility of shipping container doors. Also, allowing a shipping container to be opened during international transit allows for security breeches and violations of shipper's and/or receiver's confidentiality. The presently disclosed and claimed inventive concept(s) allows a shipping container's contents to be checked systematically and arbitrarily without the need to open any shipping container doors, with enhanced security and integrity of the shipped container.

The following five exemplary modes of ultrasonic communication capability are contemplated, but these do not limit the scope of the inventive concepts regarding other modes:

One Enclosure Unidirectional Communication (OEUC)—involves one ultrasonic transmitter placed inside a shipping container or a pressurized enclosure and one ultrasonic receiver placed on the outside of the shipping container or pressurized enclosure.

One Enclosure, Duplex Communication (OEDC)—includes co-located transmission and receiving capabilities, both inside and outside a shipping container or a pressurized enclosure. Using OEDC, it is contemplated that an operator on the outside of the shipping container or pressurized enclosure can first query, then receive, data from inside the shipping container or pressurized enclosure. Also, the duplex communication feature enables re-send protocols to be designed and developed to be used to combat channel noise and multipath effects.

Stacked Enclosures, Unidirectional Communication (SEUC)—communication between stacked shipping containers or pressurized enclosures. Two stacked shipping containers can be emulated using two corner posts—each terminated with a corner block—that are coupled by compressive loading (see FIG. 4). The objective contemplated by this scenario is that an ultrasonic transmission can be made to: traverse from a transmitter attached to the first corner post; pass through the mechanically coupled corner blocks; and be received successfully by a receiver located on the second corner post.

Stacked Enclosures, Duplex Communication (SEDC)—duplex communication between stacked shipping containers or pressurized enclosures. This mode of operation enables a stack of shipping containers or pressurized enclosures to be modeled as a linear network graph in which a given pair of nodes in the graph can communicate by employing intermediate nodes as relays/vias. This mode will also enable broadcast- and accumulation-type communication patterns to be implemented.

General Array of Enclosures (GAE) an arrangement of stacks of shipping containers or pressurized enclosures in which adjacent stacks may be aligned in a horizontal (side-by side) and/or depth (back-to-front) manner. This arrangement generalizes the linear array model associated with a single stack to either a two-dimensional grid or a three-dimensional cube. This arrangement of shipping containers or pressurized enclosures provides a communication network topology that may be represented by a two-dimensional grid or three-dimensional cube (see FIG. 24). Even if some shipping container(s) or pressurized enclosures on some stacks are not in sufficient mechanical contact with their counterpart shipping container(s) or pressurized enclosures on another adjacent stack, it is still possible for communication to be established by utilizing mechanically-connected routes that exist between a shipping container or pressurized enclosure desiring communication with another shipping container or pressurized enclosure.

Features of preferred embodiments of an ultrasonic communication system according to the instant disclosure may include but are not limited to:

Modules are sleeping (low power consumption) when not participating in communication;

Modules support various modes of communication including ultrasound, RF, IR, and wired connections;

Modules can be constructed with RF pervious material(s) to protect antenna (e.g., thick rugged plastic);

Transmitting module sends pilot tone—receiving module may detect pilot tone using low power tone detector circuitry such as the LM 567 Tone Decoder. The detection circuitry may also be passive or be active and consume a small amount of energy. In one embodiment, the detection circuitry can include a very high Q LC (inductor capacitor) circuit tuned to the frequency of the pilot tone to detect (pass) a received tone from the transducer (which is passive). In this example, it is believed that there should be enough electrical energy conversion due to the piezoelectric conversion to drive the LC circuit and wake up the rest of the circuit. In another embodiment, the detection circuitry can include a low power tone detector chip, which is not "passive" but is nearly passive (because it consumes very little energy while it listens for the tone). An exemplary passive circuit may include a passive resonant LC circuit connected directly to the transducer. The output of this circuit would then be compared to ground using a comparator, and the output of the comparator represents detection.

Pilot tone detection used as trigger to power-up communication circuitry of receiving module;

Pilot tone detection timing used to synchronize communication between transmitting and receiving modules;

Ultrasonic communication may use two or more distinct frequency bands: one for control/synchronization and another for encoded data;

Undersampling used by receiving module to reduce sampling rate of A/D converter—where undersampling is defined as intentional sampling at a lower rate to fold (or alias) specific tones to desired low frequency locations in the spectrum. In practice, undersampling can effectively reduce the required sampling rate of the A/D converter by an order of magnitude.

Undersampling reduces power consumption and cost of receiving module since power consumption is proportional to sampling rate;

Coherency among sampling rate, DFT size, and selected frequency tones is performed to maximize detection of modulated data transmission.

The following is a description of an example of the ultrasonic communication system for causing communication between a module installed on an interior surface of a metal channel formed by a shipping container and another module installed on an exterior surface of the metal channel formed by either the same or different shipping container. However, it should be understood that the ultrasonic communication system can be used for establishing communication among numerous shipping containers or pressurized enclosures that are abutted in arbitrary ways and for various other purposes as discussed above.

In an exemplary embodiment, at least one module is mounted inside a shipping container and at least one other module is mounted on the outside of either the same shipping container or another shipping container that is directly or indirectly in contact with the first. However, it is possible that some useful scenarios may involve only communication among modules mounted on the insides of distinct shipping containers.

Modules mounted on the inside of a shipping container might go several months without the opportunity to charge/replace batteries, and thus are more power constrained than modules used by an operator as described above. For this reason, the modules' circuitry can be designed to be poweraware; remaining in a low-power "sleep" mode when not actively participating in communication with other modules. Modules mounted inside a shipping container that are in transit onboard a ship may employ energy harvesting techniques that convert motion and/or vibrations to electrical energy used to charge the power supply. Alternatively, mechanisms for the conversion of thermal/heat energy to electrical energy may also be employed to charge power supplies of modules mounted inside shipping containers for extended periods of time. Modules allow attachment of various environmental sensors and have facilities for storing data gathered from these sensors. In addition to the ultrasonic mode of communication, they may also have other modes of communication including RF, IR, and wired connections. Modules have the ability to gather and store information from sensors that are co-located on the module and from information collected through communication with other modules. Operators that use modules as described above can store data for later upload to a database through interfaces with wired or wireless local area networks and/or the internet.

An exemplary embodiment of ultrasonic transducers 100a-b is shown in FIG. 1, and may include piezoelectric materials. Alternatively, an electro-mechanical "tapping" device could be used for much lower frequencies than ultrasound (in the range of tens or 100 s of Hertz), for example. Piezoelectric materials expand and contract with applied voltages. Conversely, they produce a voltage in response to deformation. The electrical characteristics of a piezoelectric element resemble those of a capacitor. Piezoelectric elements are fast and precise in the realm of mechanical motion and motion detection. Because of the two way nature of the effect, piezoelectric elements can be used as both ultrasonic transmitters and receivers. A given transducer 100a-b may have one or more resonant frequencies depending on its design and construction. Ultrasound energy is much more efficiently transmitted and received by the transducer 100 at these frequencies. A transducer 100 may be used as described in this study [5].

Figure 2:
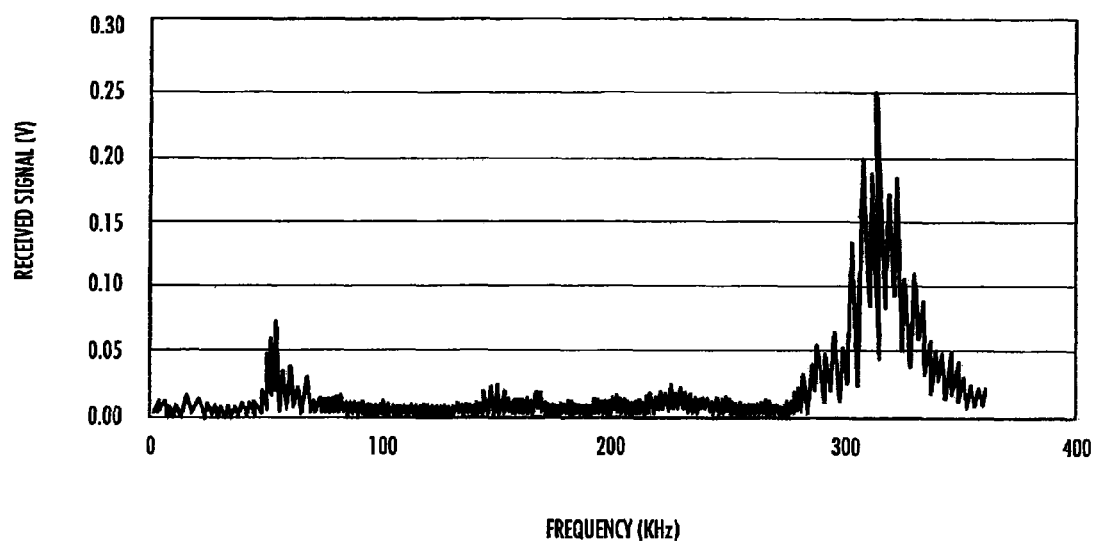
FIG. 2 is a graph showing transmission efficiency versus frequency for a pair of transducers according to the instant disclosure.

By pulsing one transducer 100a—with a receiving transducer 100b clamped face-to-face—characterization of the transmission efficiency of a transducer pair 100a-b can be determined over a wide frequency spectrum. Data gathered in this way can be used to produce an empirical frequency response curve 102, an example of which is shown in FIG. 2. From FIG. 2, it is clear that the employed transducers 100a-b exhibit two major regions of resonance. The first occurs around the manufacturer specified resonant frequency of the transducers 100a-b, at about 40 KHz [5]. It is to be understood that the term "about" as used herein should be interpreted to include a 15-20% variation due to environmental, manufacturing, or other factors/issues. The second occurs on a band beginning near 280 KHz and extending to approximately 330 KHz (although other frequency bands could be used). This second band is well displaced from the nominal 40 KHz center frequency of the transducers 100a-b and produces a better voltage response by a wide margin. In addition to the effect that transmission frequency has on transmission efficiency, the overall transmission efficiency is also dependent upon the pressure with which a transducer 100a-b is mounted to the opposing surface.

Figure 3:
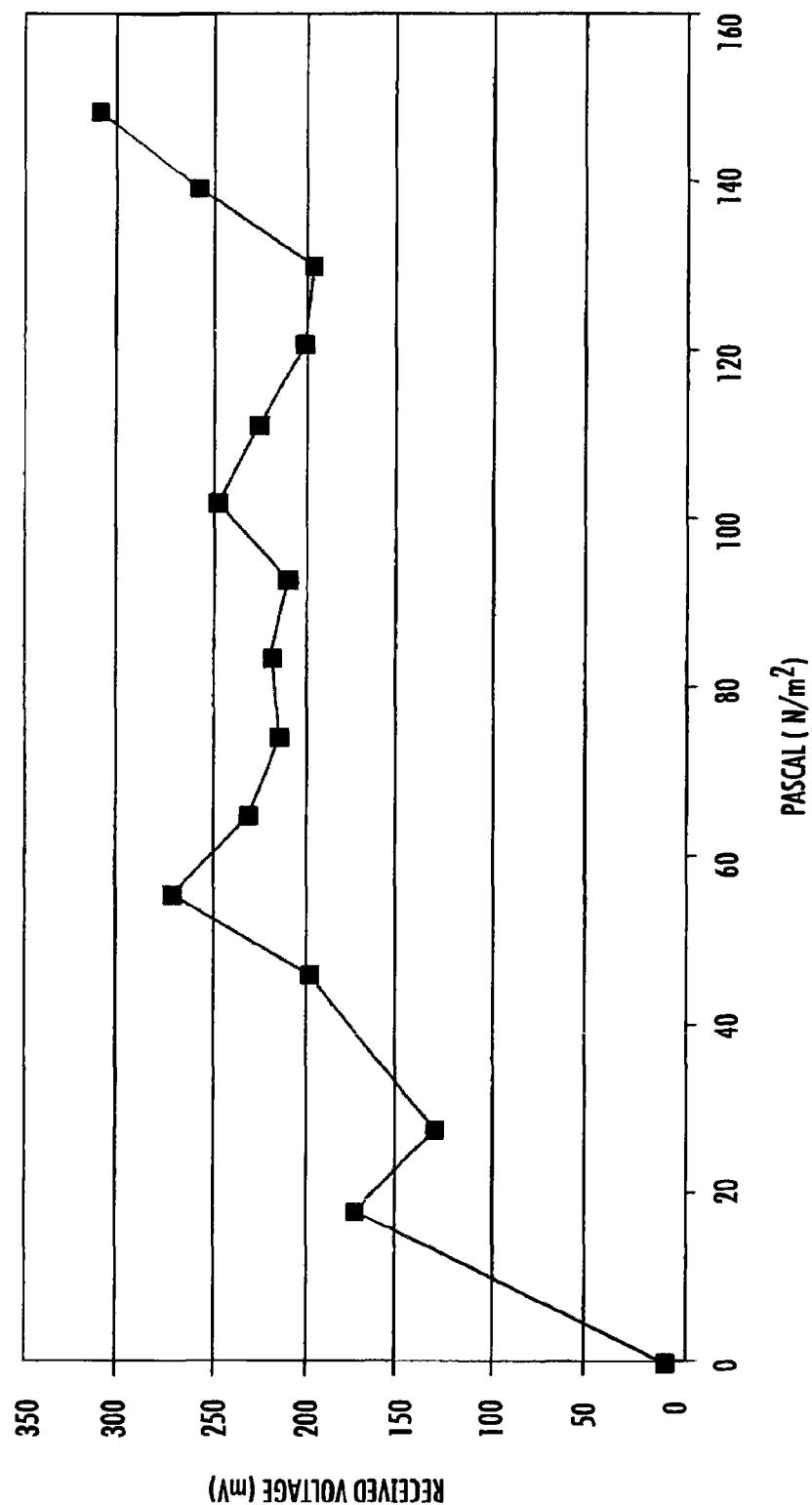
FIG. 3 is a graph showing received signal voltage versus the pressure with which the transducer is placed in contact with the opposing surface with the transmitted signal at 296 KHz and 6 volts peak-to-peak according to the instant disclosure.

As illustrated by FIG. 3, transmission efficiency is primarily an increasing function of the value of pressure applied in mounting the transducer 100a-b to the surface. From FIG. 3, observe that there is a reasonable range of pressures within which the transmission efficiency is relatively constant.

Figure 4:
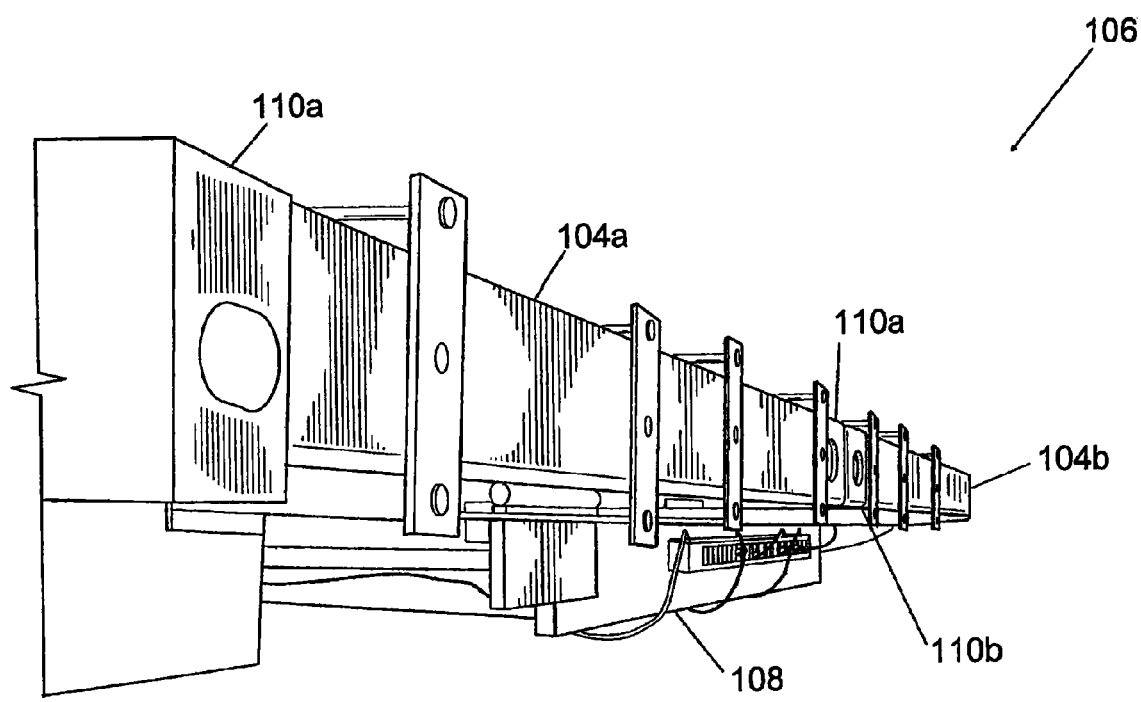
FIG. 4 is an embodiment of a corner post setup showing two corner posts held in compression with hand hoist and nylon strapping according to the instant disclosure.

Shown in FIG. 4 is an experimental setup 106 of first and second corner posts 104a-b of shipping containers were acquired for demonstrating a communication system according to the instant disclosure. The first and second corner posts 104a-b are laying horizontally on a support structure 108, and are held in compression against one another.

Figure 5:
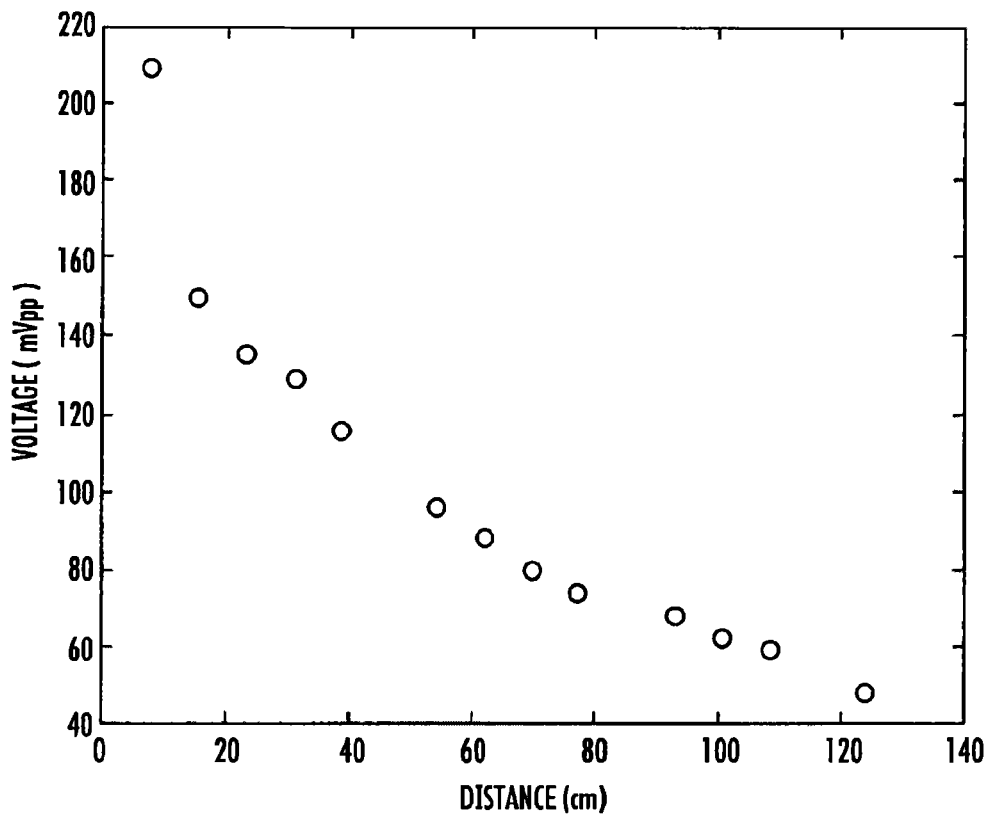
FIG. 5 is a graph of measured (received) voltages as a function of distance between transmission and receiving transducers along the length of a corner post according to the instant disclosure.

FIG. 5 is an example of measurements taken using the experimental setup 106, which illustrates how received signal strength degrades as a function of distance between transmitting transducer 100a and receiving transducer 100b. Importantly for shipping container applications, it was discovered that ultrasonic signals can be transmitted from the first corner post 104a, and received on the second corner post 104b abutted to the first corner post 104a.

Figure 6:
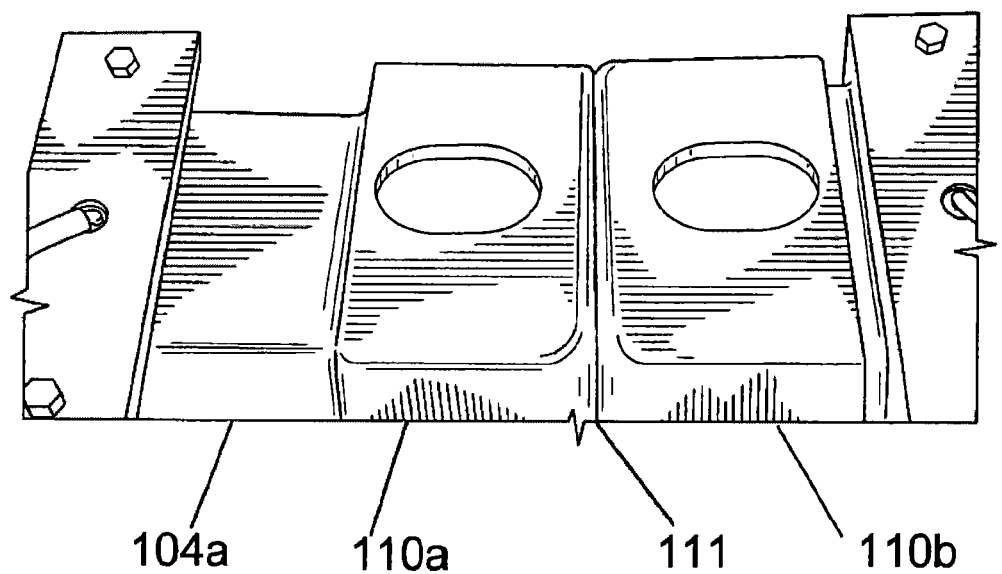
FIG. 6 is an embodiment of a corner block interface of two abutting corner posts according to the instant disclosure.

FIG. 6 shows a first corner post 104a had a first corner block 110a and the second corner post 104b has a second corner block 110b. Also shown is an exemplary embodiment of an abutting interface 111 of the first and second corner blocks 110a-b at the end of the first and second corner posts 104a-b.

Figure 7:
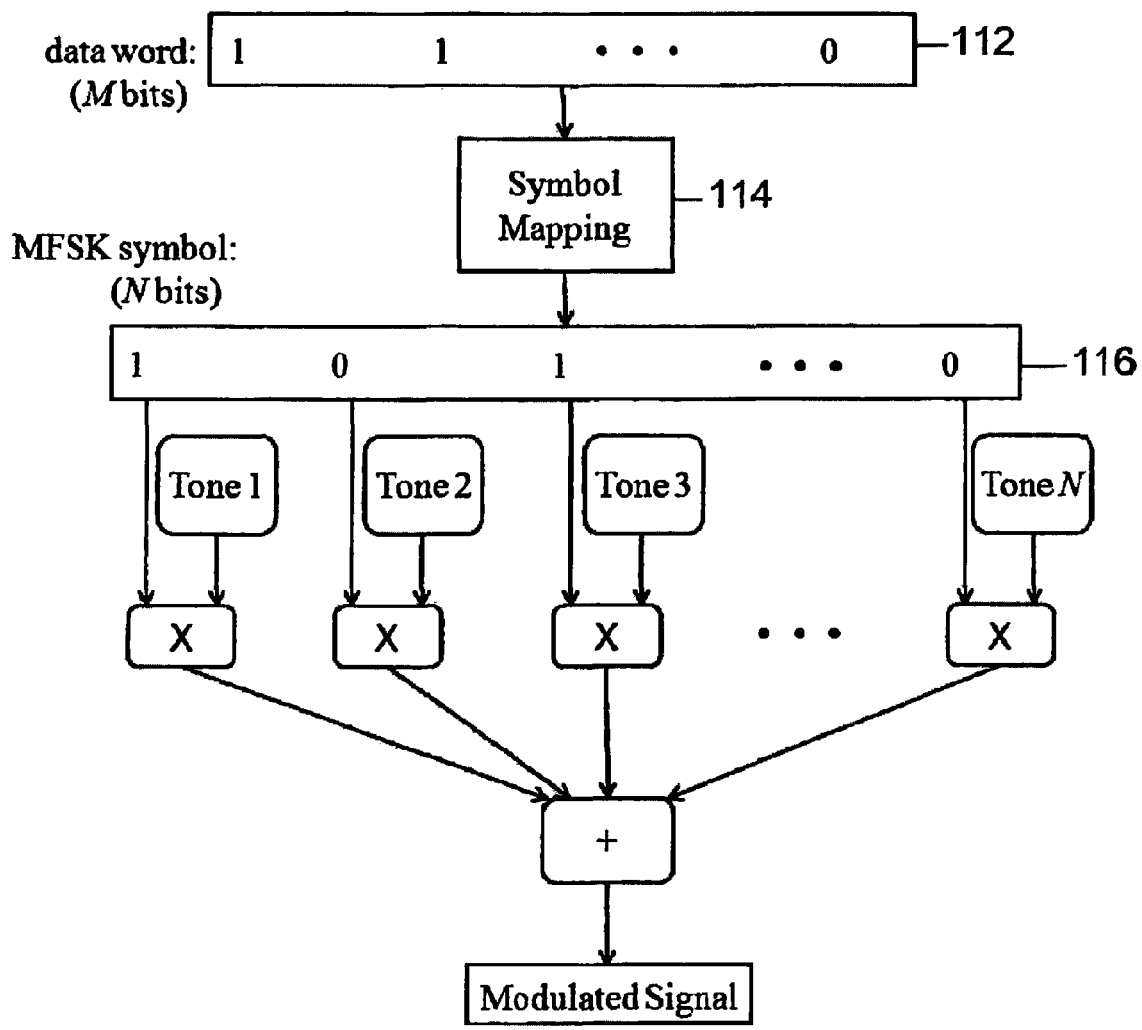
FIG. 7 is a block diagram illustrating an exemplary MFSK encoding scheme according to the instant disclosure.

Referring now to FIG. 7, Multi-Tone Frequency Shift-Keying (MFSK), which is a generalization of frequency-shift-keying (FSK), is known to be well-suited for fading channels [6]. Ultrasonic signals transmitted through mediums such as steel or water are subjected to extreme fading effects. In the case of transmitting ultrasound through a steel beam, fading is primarily due to two phenomena: (1) multipath effects due to multiple reflections off of channel boundaries and (2) the effect of multiple Lamb waves traveling through the channel at different velocities [1].

For example, let N denote the set of tones available for defining symbols. Traditional FSK represents different symbols with individual sinusoidal tones. Thus, for a pool of N tones, FSK can encode at most N symbols. MFSK uses different combinations of multiple frequencies (summed tones) to encode symbols [6]. The MFSK scheme in which exactly Q tones are used at a time is known as Q-tone FSK, which can encode symbols. On the transmission side, an M-bit data word 112 may be input to a symbol encoder module 114, which produces an N-bit symbol 116 as shown in FIG. 7. For Q-tone FSK, exactly Q of these N bits are unity, which correspond to selected tones of the symbol.

In principle, an MFSK receiver 118 of a module 140 (FIGS. 13-14) may employ a bank of matched filters with center frequencies tuned to each of the N tones. In an exemplary implementation of the inventive concept(s) disclosed herein, the received signal can be digitized, and a fast Fourier Transform (FFT) can be performed on a receiver's data signal processor (DSP) 122. It is to be understood, however, that digital or analog matched filters tuned to the N tones can be used with the inventive concept(s) disclosed herein as well. The receiver 118 thresholds the magnitude of the values from the FFT frequency bins associated with the N tones. If exactly Q tones exceed prescribed thresholds, then the corresponding symbol was detected. Otherwise, the receiver 118 declares a transmission error.

In one embodiment of a communication system 120 according to the instant disclosure, N=16 tones may be used. In such embodiment, a select group of frequencies within a specific band may be considered. The carrier frequencies may be in the band of 280 to 320 KHz, for example. These carrier frequencies, fk are listed in Table I. Note that the spacing of the tones is not uniform across this range. These selected frequencies have been determined experimentally by maximizing the frequency response through the channel. Further optimization in selecting frequencies could include the impact of choosing frequencies so that the employed undersampling rate (described in the following paragraph) results in coherency for the FFT size used.

TABLE I

| Tone Number | Frequency Value (KHz) |
|---|---|
| f0 | 284.0 |
| f1 | 286.5 |
| f2 | 287.5 |
| f3 | 290.0 |
| f4 | 292.0 |
| f5 | 294.0 |
| f6 | 296.0 |
| f7 | 297.5 |
| f8 | 299.9 |
| f9 | 302.3 |
| f10 | 303.6 |
| f11 | 304.3 |
| f12 | 305.8 |
| f13 | 308.2 |
| f14 | 314.0 |
| f15 | 316.2 |

A practical key to successfully realizing the FFT approach at the receiver 118 may be the design of an implementation of an efficient digital sampling procedure based on the principle of undersampling. This approach may enable the sampling of the received signal to be at a rate of only 165 KHz, which is just slightly over one-half the maximum tone frequency of 316.2 KHz. Had this undersampling procedure not been utilized, then an ADC sampling rate of around 3 MHz would have been required. Sampling at such a high rate is impractical for the envisioned applications that have severe cost and power constraints. By definition, "bandpass sampling" is a special form of undersampling that translates a high frequency bandpass signal to a baseband frequency [7]-[10]. Moreover, bandpass sampling is a "software defined radio" concept that provides a technique of reduced sampling speeds, which directly translates to reduced power consumption (as the authors have been able to demonstrate on other projects, i.e. [11]).

Coherence in a sampled waveform is advantageous in order to use data analysis techniques, such as the discrete Fourier transform (DFT). It is assumed that this DFT may be implemented in its pure form or as a fast Fourier transform (FFT). In general, coherency as used herein will allow for an integer number of samples.

Let:
Number of tones: N
Length of the discrete Fourier transform: L=2m, where m is an integer
Sampling frequency: Fs
Tone number: f0, f1, . . . , fN−1
Integer number of periods or cycles in length L: P The discrete Fourier transform for a sequence of length L is defined here as:

$$X[k] = \sum_{n=0}^{L-1} x[n] e^{-j\frac{2\pi}{N}nk}$$

where the variable "k" denotes a particular frequency bin. The discrete frequency related to each k is an integer multiple of Fs/L, and k ranges from 0 to L−1.

Each analog tone {f0, f1, . . . , fN−1} must be selected so that it can be uniquely resolved by one frequency bin of the discrete Fourier transform. In particular, each selected tone is a multiple of the discrete frequency resolution: [Fs/2]/[L/2].

In order to ensure coherency, an integer number of periodic cycles of the sampled waveform must be collected and processed by the discrete Fourier transform. This will be ensured when:

$$\frac{F_S}{f_n} = \frac{P}{2^m},$$

n=0, 1, . . . , N−1
where, fn, corresponds to each tone {f0, f1, . . . , fN−1}.

Figure 8:
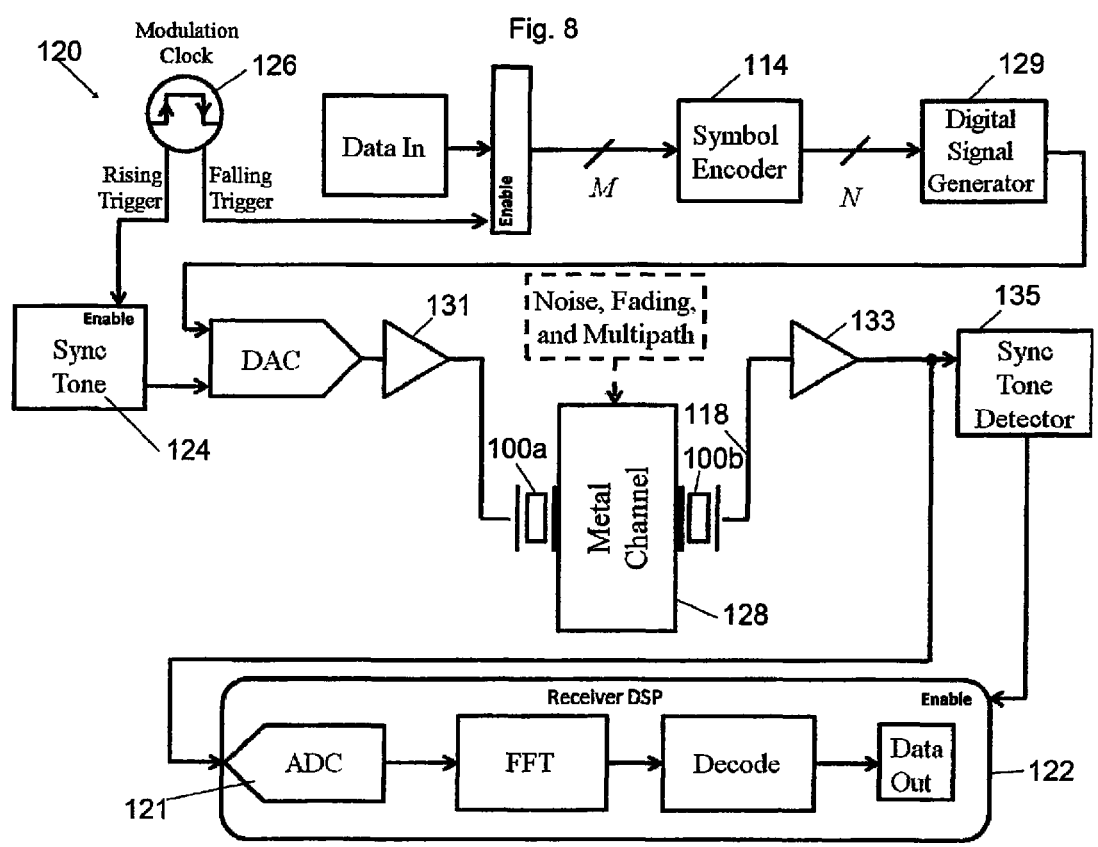
FIG. 8 is a logical block diagram of an exemplary ultrasonic communication system constructed in accordance with the presently disclosed inventive concept(s).

FIG. 8 shows a logical block diagram of an exemplary embodiment of a communication system 120 according to the instant disclosure. A sync tone 124 is sent at the beginning of a transmission cycle, which corresponds to the modulation clock 126 rising to its high state. When the modulation clock 126 falls to its low value at half the clock period, the MFSK symbol 116 is transmitted. Note that while FIG. 8 shows the transmitting transducer 100a and the receiving transducer 100b in contact with different physical sides of metal channel 128, the transmitting transducer 100a and the receiving transducer 100b may or may not be on the same physical side of the metal channel 128. Furthermore, the metal channel 128 may physically involve one or more abutted corner posts 104a-b (not shown) with transducers 100a-b mounted on one or both physical sides of the metal channel 128.

Initial focus was on designing and constructing a receiver 118 to receive and decode MFSK symbols 116 from a metal channel 128 (which may be a corner post 104a-b). On the transmission side, an arbitrary signal generator 129 (Tektronix 81150A), and an amplifier circuit 131 were used to produce and transmit the MFSK symbols 116 (In a more complete production implementation, the MFSK signal may be generated on the DSP 122). An exemplary embodiment of a receiver 118 may include an amplifying and biasing circuit 133, an LM567 tone decoder 135, and a DSP 122. The amplifying and biasing circuit 133 may be used to amplify the received signal in order to utilize the full dynamic range of the DSP 122 on-board analog-to-digital converter (ADC) 121. The circuit had a SNR of 27 dB and a gain of 600 v/v. This amplifies the signal from 5 mVpp to 3 Vpp on a 1.5 V bias.

The LM567 tone decoder 135 implementation was chosen because it provides an easy and inexpensive way to detect the synchronization tone. Instead of the DSP 122 constantly sampling and performing filtering to detect synchronization, the DSP 122 can be put into a low power wait state until the sync tone is detected by the LM567 tone decoder 135. This is a key in keeping the communication module 140 as energy efficient as possible (in addition to providing synchronization necessary to time when the receiver 103b begins sampling the received modulated data signal).

Using the DSP 122 is desirable because it is able to rapidly compute the spectrum of the received signal via the FFT. The Texas Instruments TMS320LF2407A DSP 122 was chosen for this project, based on its low-cost aspects, features, and low-power consumption. The F2407A is a 16-bit fixed point DSP 122 capable of operating at speeds up to 40 million instructions per second. (Other implementations may explore the use of other DSP 122 chips including ones like the SHARC Processor from the Analog Devices Company). Other implementations may include the use of application specific integrated circuits (ASICs), field programmable gate arrays (FPGAs), or other digital logic implementations. Completely analog circuit implementations could also be deployed.

The DSP 122 has an internal flash memory (32K, not shown), which allows for rapid prototyping and eliminated costly off-chip memory. This particular DSP 122 also has an on board ADC 121 with a 500 ns conversion time. This feature mitigated the need of an additional off board converter.

Figure 9:
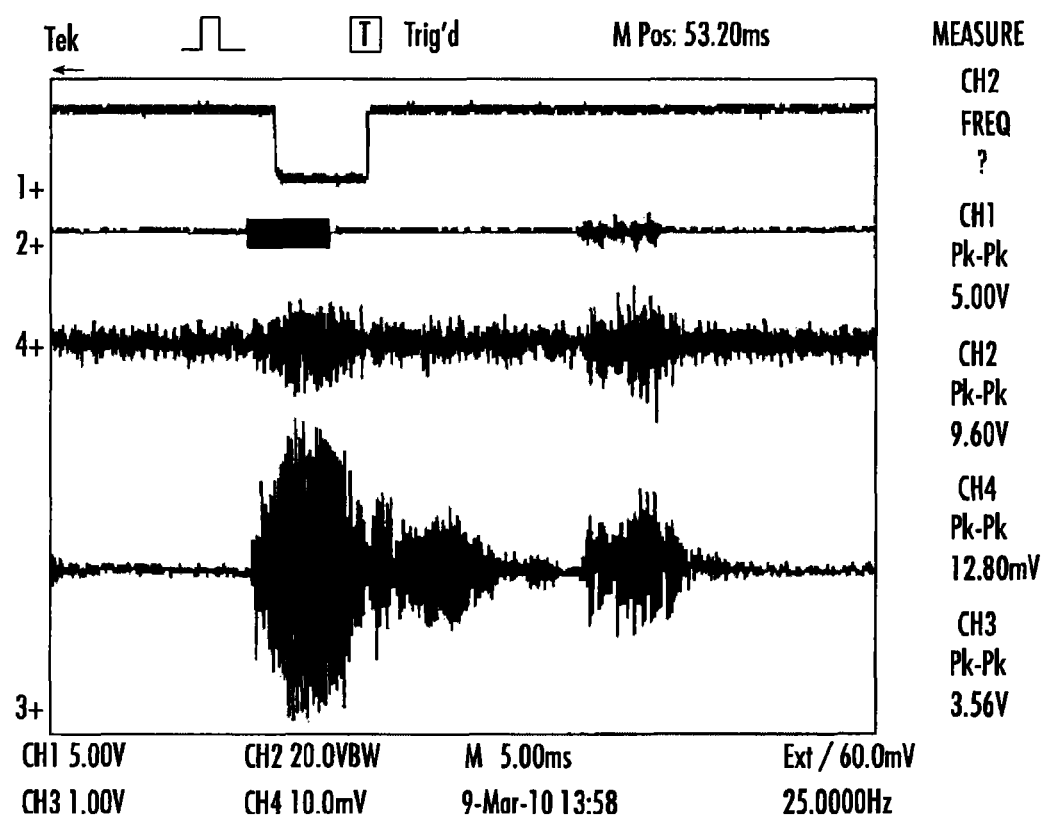
FIG. 9 is a graph of the following signals from top to bottom: LM567 output trigger; transmitted MFSK signal; received signal; and amplified signal according to the instant disclosure. The first signal (on the left) is a sync tone; the second smaller signal is a MFSK waveform.

FIG. 9 shows actual scope traces of the transmission of the sync tone followed by the MFSK signal. As the MFSK signal travels down the metal channel 128, the signal degrades and fades but is eventually picked up by the receiving transducer 100b. This signal was next amplified to 3 Vpp and sent to a biasing circuit 133 as well as the tone decoder 135.

Figure 10:
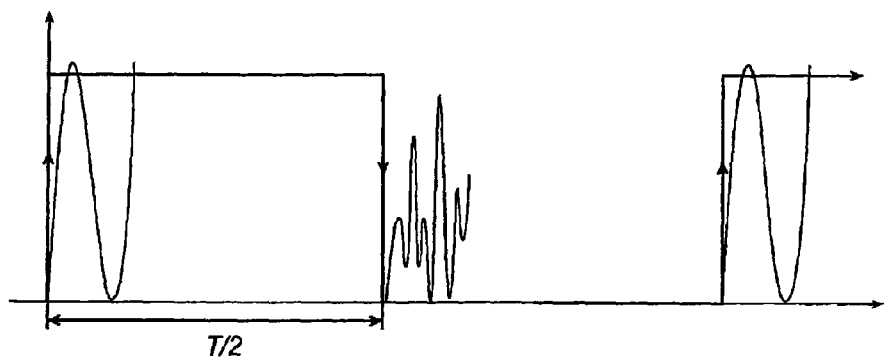
FIG. 10A is a timing diagram which depicts transmission of the sync tone (e.g., sine wave) and the data signal (shown in the middle), according to the instant disclosure.
FIG. 10B is a timing diagram which depicts detection and the sampling of the data according to the instant disclosure.
Figure 10:
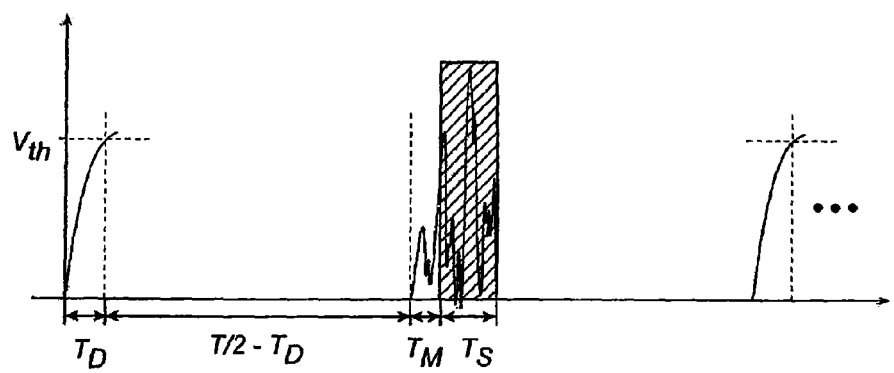

FIGS. 10A-10B provide a detailed timing diagram showing how the sync tone is used to synchronize the receiver 118 with the transmitted signal. When the sync tone is transmitted, the tone decoder 135 detects the tone after a (predictable) delay time of TD. The value of TD includes the time for the signal to propagate down the metal channel 128 as well as trigger the amplifying and biasing circuit 133 and/or the tone decoder 135, such as the LM567. Once triggered, the tone decoder 135 pulls down a general purpose I/O (GPIO) on the DSP 122, such as the F2407A. The GPIO wakes up the DSP 122 from its power-efficient mode and activates the necessary peripherals to start receiving and processing the received ultrasonic signal. The DSP 122 waits for a specified time of T/2−TD+TM, where TM represents a safety margin to ensure the DSP 122 takes samples near the center of the received signal pulse. The DSP 122 may sample at a rate of 165 KHz for a total sampling time of TS, and may collect 512 samples. The time interval in which sampling occurs is depicted by the shaded region in FIG. 10B. Once 512 samples are collected, a radix-2 FFT is performed on the samples. The magnitude of the FFT is then compared to a threshold at specific frequency bins corresponding to the frequency tones of the MFSK modulation.

Figure 11:
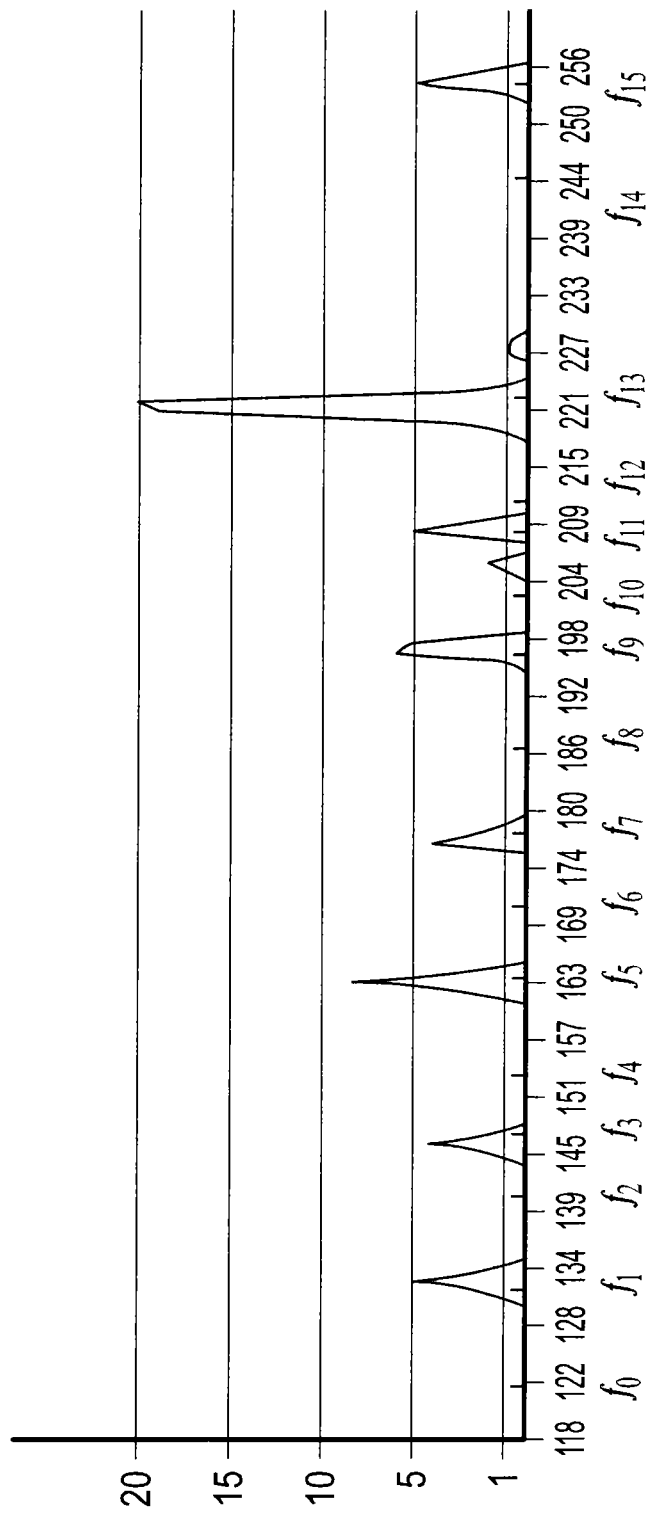
FIG. 11 is a graph of FFT of received hexadecimal symbol 0xAAAA by a communication system according to the instant disclosure.
Figure 12:
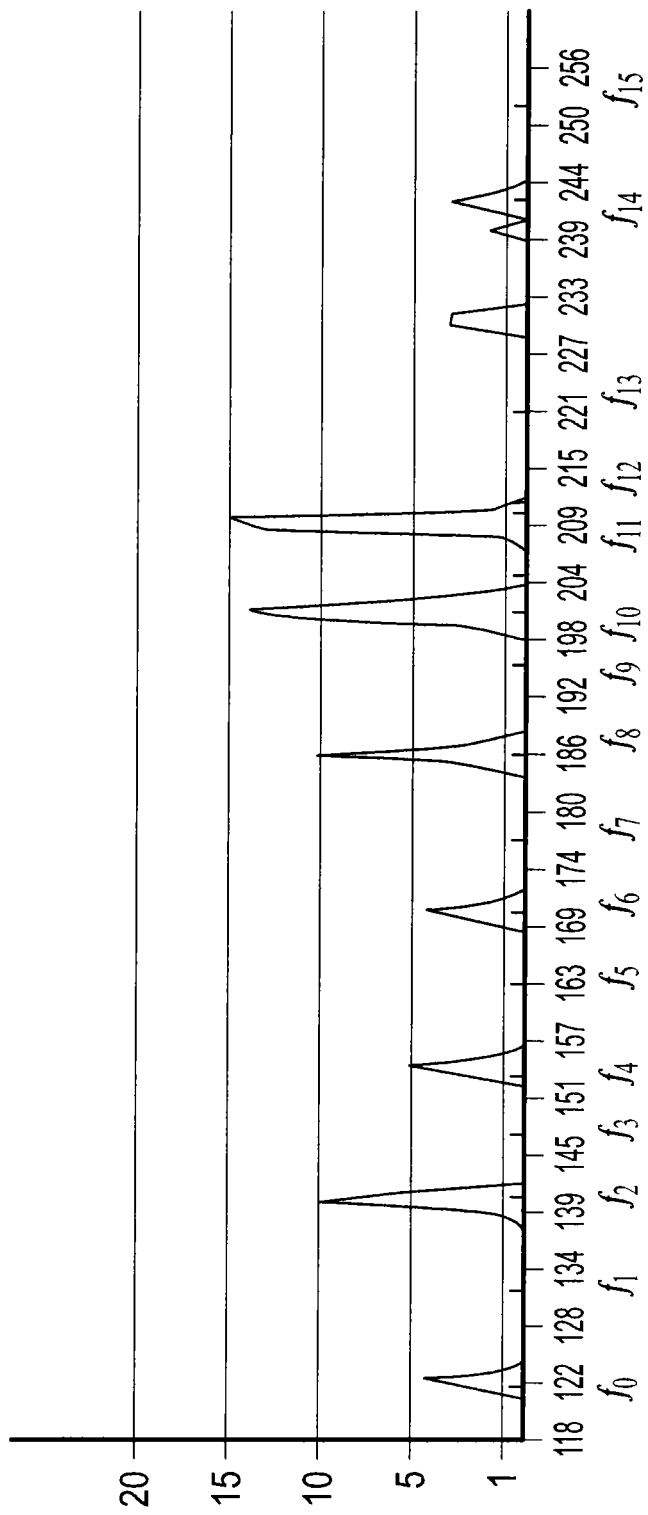
FIG. 12 is a graph of FFT of received hexadecimal symbol 0x5555 by a communication system according to the instant disclosure.

FIGS. 11 and 12 show the FFT results of two example MFSK symbols. Shown in FIG. 11 is the actual real-time output of the DSP 122, as taken from a screen capture of the memory contents. Shown in FIG. 12 is the actual real-time output of the DSP 122, as taken from a screen capture of the memory contents. Annotations f0 to f15 have been superimposed on the graph. The hexadecimal representations of these symbols are 0xAAAA and 0x5555. Thus, these are examples of MFSK symbols 116 for N=16 and Q=8. Although some extraneous frequencies are present (e.g., between f13 and f14 on both figures) they do not impact detection of the MFSK symbol 116, because detection is performed by thresholding only the frequency bins associated with the N=16 MFSK tones.

Figure 13:
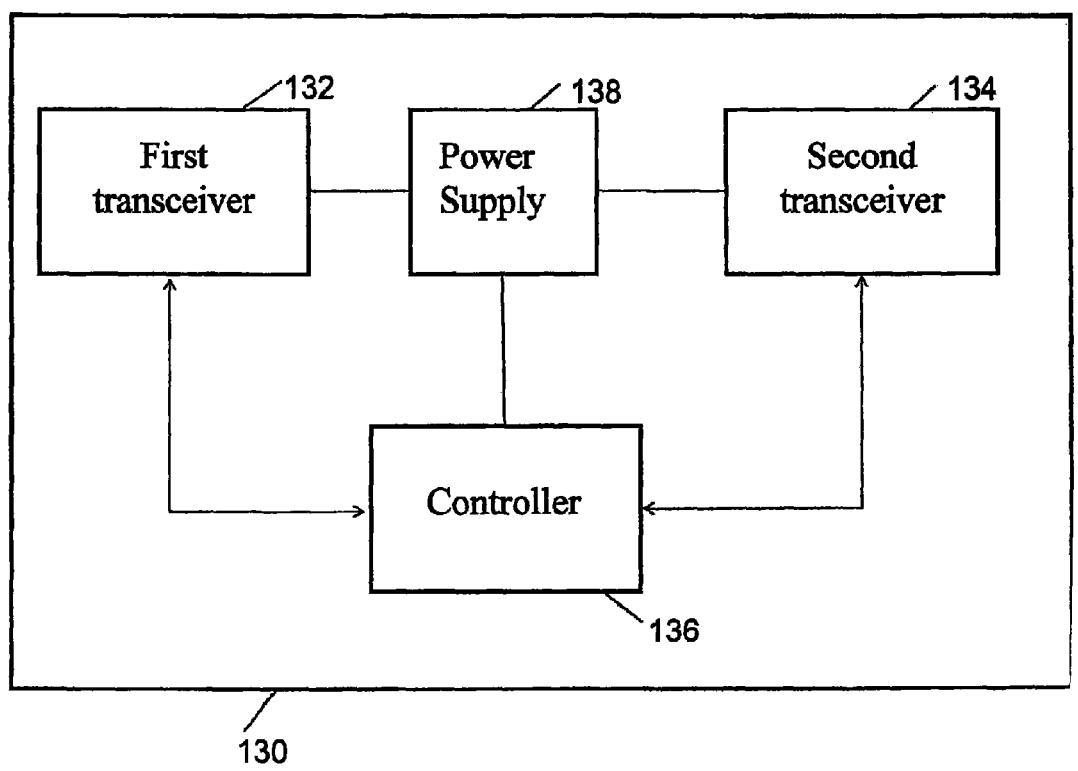
FIG. 13 is a block diagram of an exemplary module adapted to be positioned on an interior surface of an enclosure according to the instant disclosure.
Figure 15:
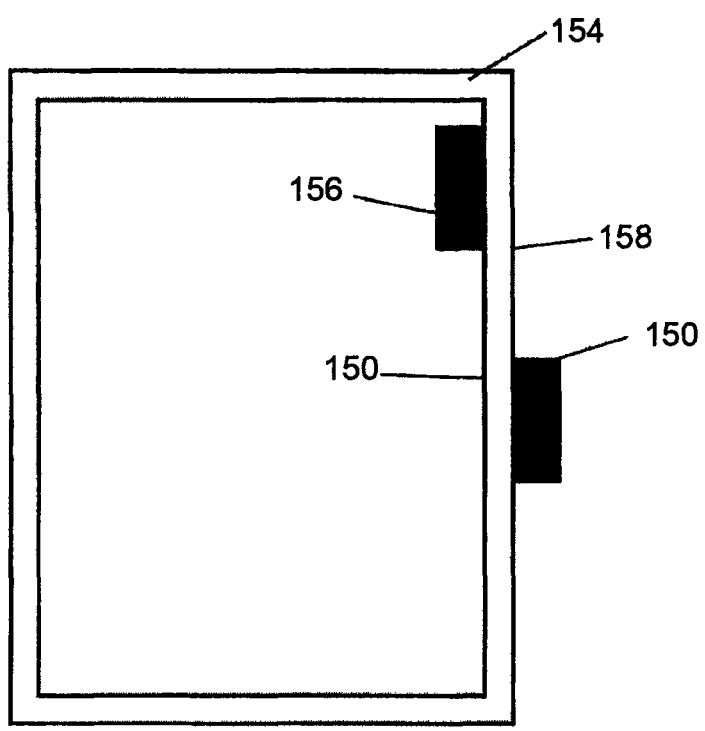
FIG. 15 is a diagrammatic view of an exemplary embodiment of two modules according to the instant disclosure.

Referring now to FIG. 13, shown therein is a block diagram of an exemplary module 130. More specifically, FIG. 13 is a block diagram of an exemplary module 130 adapted to be positioned on an interior surface 156 of an enclosure 154 (FIG. 15). The module 130 depicted in FIG. 13 includes a first transceiver 132, a second transceiver 134, one or more controllers 136, and a power supply 138. The first transceiver 132 can be a wired or a wireless transceiver 132 and is used for communication with communication devices other than another module to typically collect data indicative of conditions or devices on the interior of the enclosure. Examples of communication devices include environmental sensors(s), actuator(s), RFID tags and the like. The second transceiver 134 can comprise an ultrasonic transceiver 100a typically including a piezoelectric element (although other types of elements can be used) for communicating with another module using the metal channel 128 (e.g., a corner post 104a-b) as discussed above.

The controller 136 can be formed of a collection of digital and analog electronics including but not limited to: DSP (digital signal processor); FPGA (field programmable gate array); ASIC (application specific integrated circuit); memory/storage; DAC (digital to analog converter); ADC (analog to digital converter); and analog circuitry such as amplifiers, waveform shaping, rectifiers, filters and the like. The controller 136 can be programmed with computer executable instructions that when executed by a processor, such as DSP 122 causes the controller 136 to enable the first transceiver 132 and the second transceiver 134 to communicate as discussed above. In particular, the computer executable instructions can be in the form of a variety of different types of functional logic, such as FFT (fast Fourier transform); spectral decomposition; signal generation; encoding scheme(s); decoding scheme(s); filtering; data compression scheme(s); error detection/correction scheme(s); automatic gain control; integration among multiple transceivers based on multiple modes of communication (e.g., ultrasound, RF, IR, wired); human interaction (e.g., through keypad for input from human and display for output to human); interaction among multiple communication protocols (e.g., 802.11, TCP/IP, custom ultrasonic, and GPS); and communication schemes for highly fading and multipath channels (e.g., ultrasound through steel) including MFSK and/or FSK.

The power supply 138 can be implemented in a variety of manners such as non-rechargeable battery(s); rechargeable battery(s); and motion/vibration/thermal energy harvesting.

Figure 14:
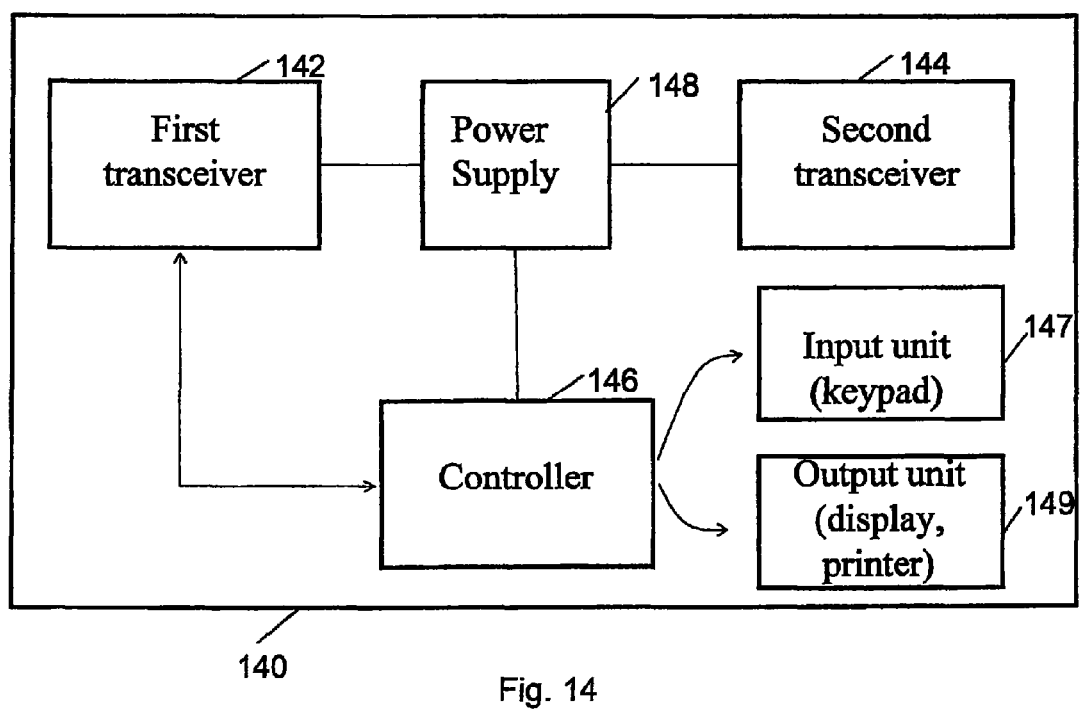
FIG. 14 is a block diagram of an exemplary embodiment of a module adapted to be positioned on an exterior surface of an enclosure.

Referring now to FIG. 14, a block diagram of an exemplary embodiment of a module 140 adapted to be positioned on an exterior surface 158 of an enclosure 154 (FIG. 15) is shown. The module 140 depicted in FIG. 14 includes a first transceiver 142, a second transceiver 144, one or more controllers 146, a power supply 148 an input unit 147 and an output unit 149. The second transceiver 144 can be a wired or a wireless transceiver 144 and is used for communication with communication devices other than another module to typically communicate data collected from the module 130 depicted in FIG. 13 to the other communication device. Examples of communication devices include other modules, portable readers, wireless networking equipment and the like. The first transceiver 142 can comprise an ultrasonic transducer 100b typically including a piezoelectric element (although other types of elements can be used) for communicating with another module using the metal channel 128 (e.g., a corner post 104a-b) as discussed above.

The controller 146 can be formed of a collection of digital and analog electronics including but not limited to: DSP (digital signal processor); FPGA (field programmable gate array); ASIC (application specific integrated circuit); memory/storage; DAC (digital to analog converter); ADC (analog to digital converter); and analog circuitry such as amplifiers, waveform shaping, rectifiers, filters and the like. The controller 146 can be programmed with computer executable instructions that when executed by a processor causes the controller 146 to enable the first transceiver 142 and the second transceiver 144 to communicate as discussed above. In particular, the computer executable instructions can be in the form of a variety of different types of functional logic, such as FFT (fast Fourier transform); spectral decomposition; signal generation; encoding scheme(s); decoding scheme(s); filtering; data compression scheme(s); error detection/correction scheme(s); automatic gain control; integration among multiple transceivers based on multiple modes of communication (e.g., ultrasound, RF, IR, wired); human interaction (e.g., through keypad for input from human and display for output to human); interaction among multiple communication protocols (e.g., 802.11, TCP/IP, custom ultrasonic, and GPS); and communication schemes for highly fading and multipath channels (e.g., ultrasound through steel) including MFSK and/or FSK.

The power supply 148 can be implemented in a variety of manners such as non-rechargeable battery(s); rechargeable battery(s); motion/vibration/thermal energy harvesting and a solar power supply for harvesting solar energy.

The input unit 147 can be a keypad, touch screen or the like; and the output unit 149 can be a display, printer, or the like.

Referring now to FIG. 15, shown therein are a first module 140 and a second module 150, positioned on an enclosure 154 with module 140 positioned on an interior surface 156 of the enclosure 154 and module 150 positioned on an exterior surface 158 of the enclosure 154.

Figure 16:
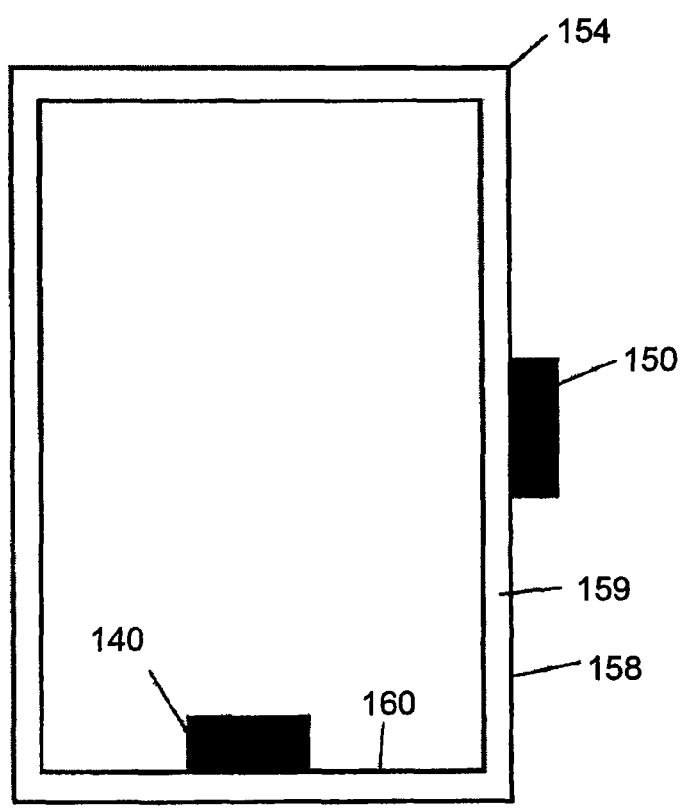
FIG. 16 is a diagrammatic view of another exemplary embodiment of two modules according to the instant disclosure.

Referring now to FIG. 16, shown therein are a first module 140 and a second module 150 positioned on the enclosure 154 with module 140 positioned on a bottom interior surface 160 of the enclosure 154 and module 150 positioned on an exterior surface 158 of a sidewall 159 of the enclosure 154.

Figure 17:
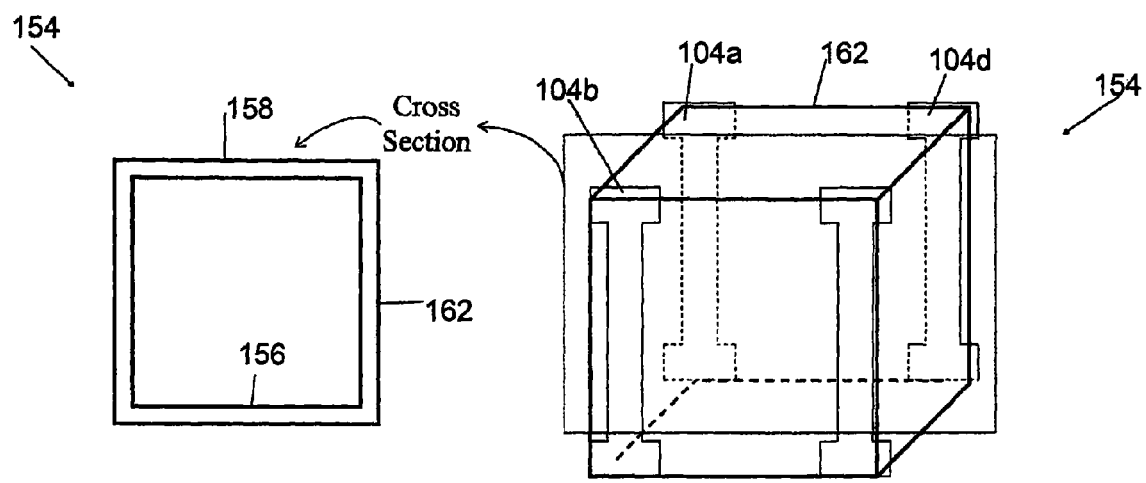
FIG. 17A is a perspective view of an enclosure formed by a shipping container.
FIG. 17B is a cross-sectional view of the enclosure depicted in FIG. 17A.

Referring now to FIGS. 17A and 17B, shown therein is an enclosure 154 formed by a shipping container 162. The shipping container 162 is shown as having four corner posts 104*a-d*. The shipping container 162 has one or more internal surfaces 156 and one or more external surfaces 158.

Figures 18A, 18B:
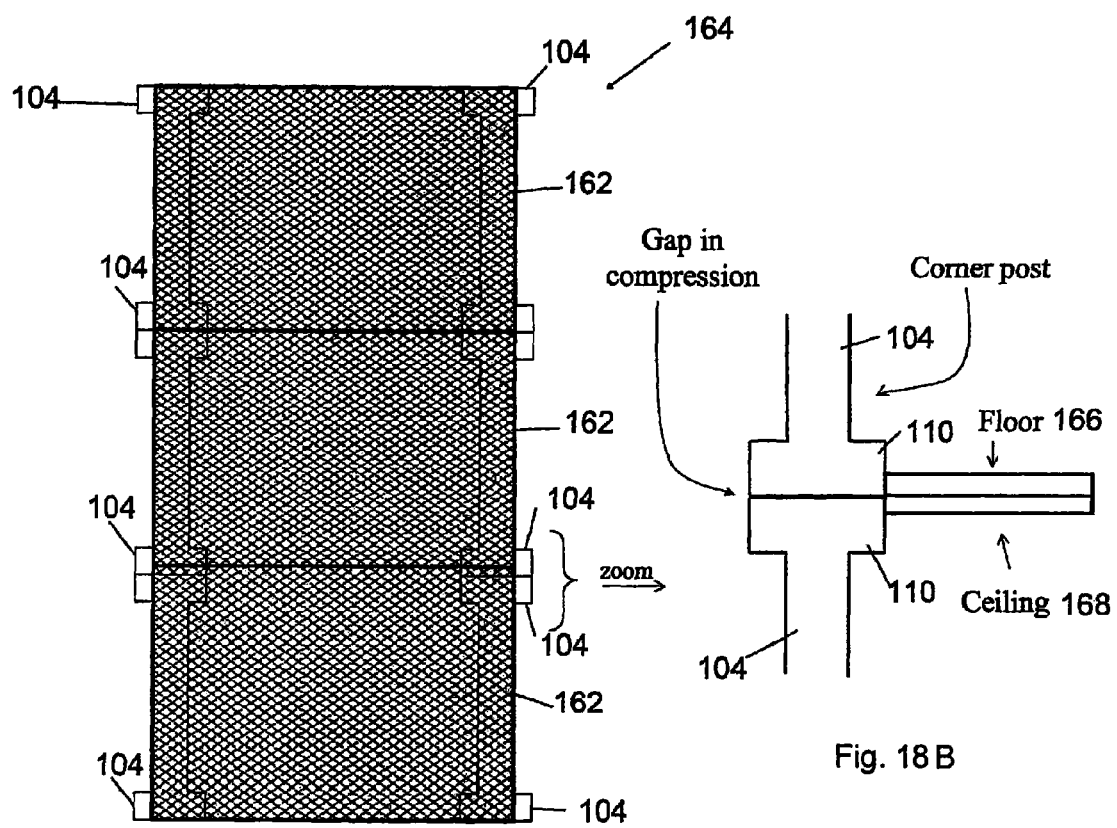
FIG. 18A is a front-elevation view of an exemplary stack of shipping containers according to the instant disclosure.
FIG. 18B is a front-elevation view of an exemplary embodiment of a compression interface formed by two abutting shipping container corner blocks within the stack of shipping containers depicted in FIG. 18A.

Referring now to FIG. 18A shown therein is a stack 164 of shipping containers 162. The stack 164 is shown as having three shipping containers 162, with corner posts 104 abutting one another. Referring now to FIG. 18B, shown therein are two corner posts 104 of two shipping containers 162 from the stack 164, with the corner posts 104 abutting one another, and a floor 166 of a first shipping container 162 disposed above a ceiling 168 of a second shipping container 162.

Figure 19:
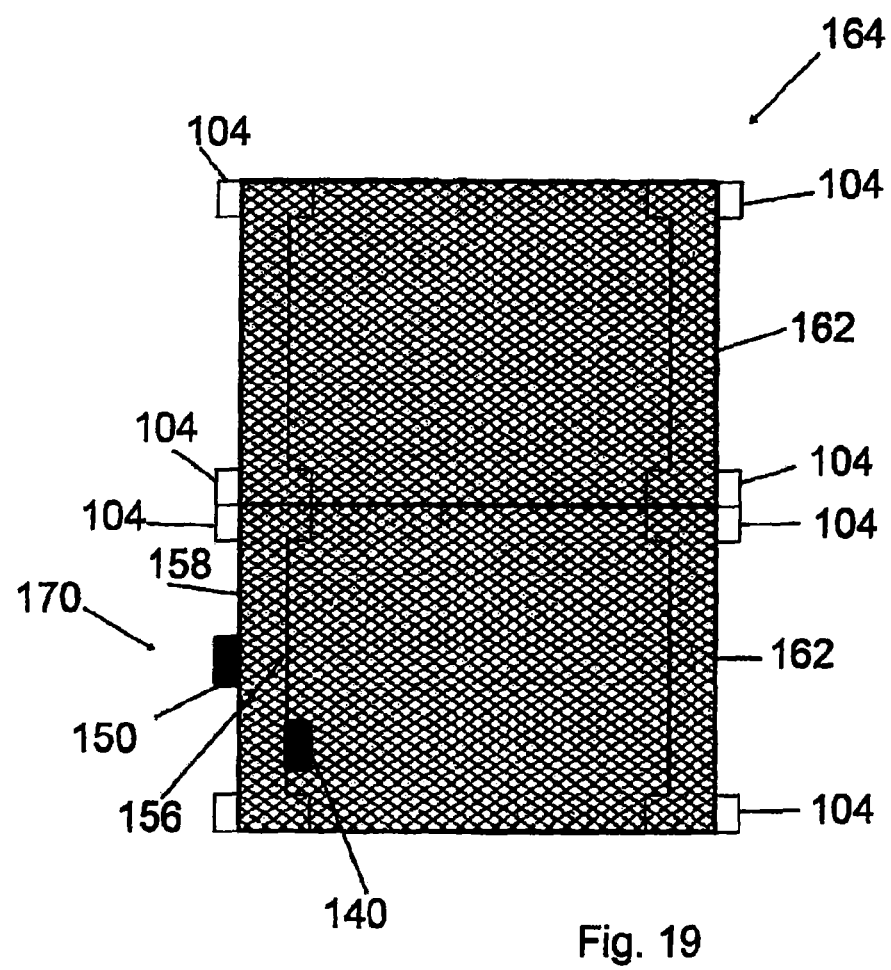
FIG. 19 is a diagrammatic view of an example of two stacked shipping containers according to the instant disclosure.

Referring now to FIG. 19, shown therein is an exemplary embodiment of non-axial single shipping container communication system 170 according to the instant disclosure having modules 140 and 150 positioned on an interior surface 156 and an exterior surface 158 respectively, of one of two shipping containers 162 forming a stack 164, and with modules 140 and 150 spaced apart axially from one another.

Figure 20:
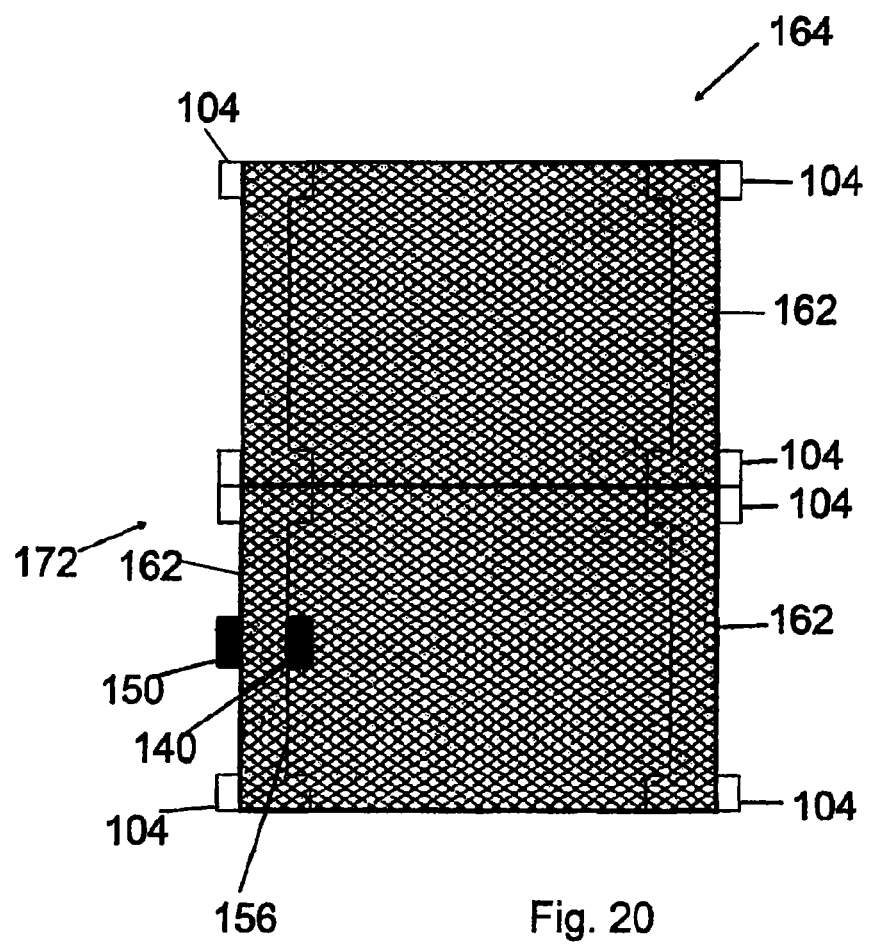
FIG. 20 is a diagrammatic view of an embodiment of a shipping container stack according to the instant disclosure.

Referring now to FIG. 20, shown therein is an embodiment of the stack 164 comprising two stacked shipping containers 162 showing an example of axial single shipping container communication system 172 having modules 140 and 150 positioned on the interior surface 156 and the exterior surface 158 respectively of one of the shipping containers 162 and with the modules 140 and 150 being aligned axially with one another.

Figure 21:
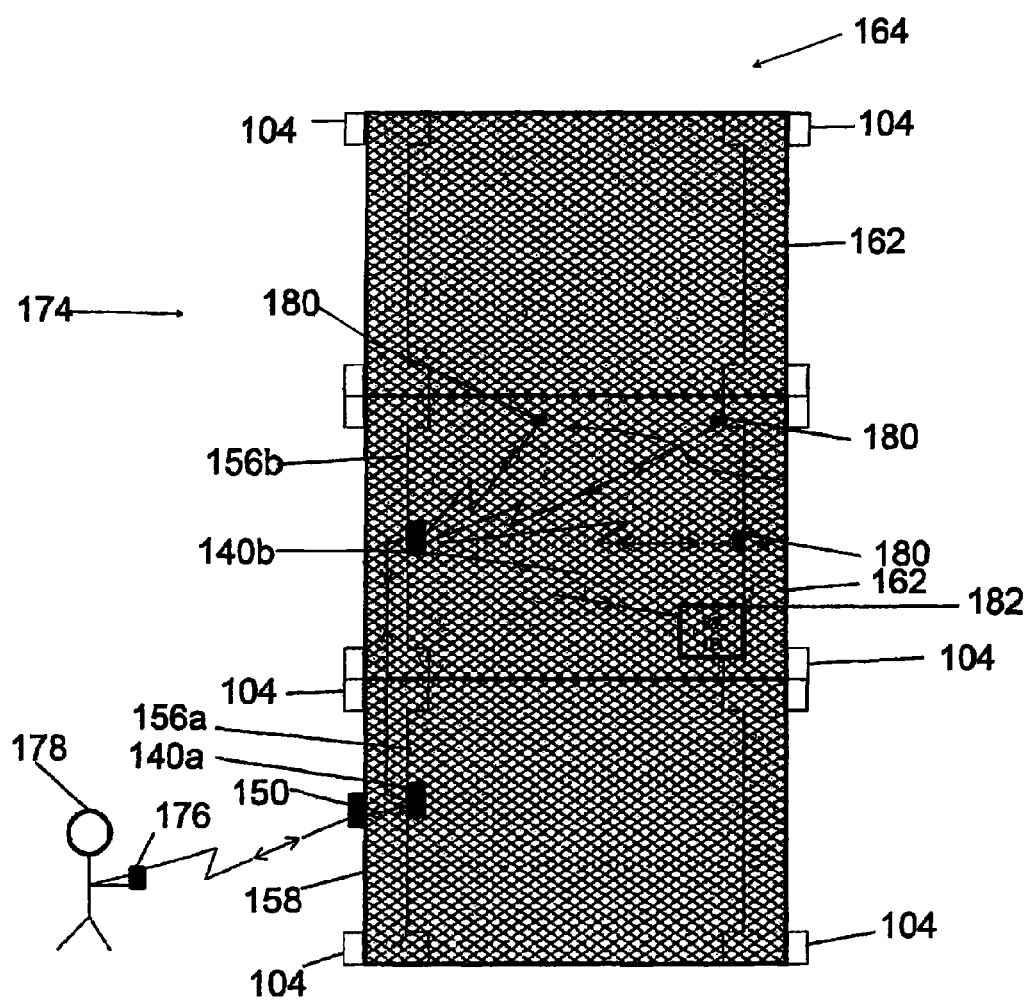
FIG. 21 is a diagrammatic view of three stacked shipping containers showing a communication system according to the instant disclosure.

Referring now to FIG. 21, an exemplary embodiment of a communication system 174 shown therein comprises: (1) ultrasonic communication through abutted corner posts 104 between two modules 140*a* and 140*b* positioned on interior surfaces 156*a* and 156*b* of adjacent shipping containers 162, (2) wireless communication between a portable reader 176 held by an individual 178 and a module 150 positioned on an exterior surface 158 of a shipping container 162, and (3) wired or wireless communication between a module 140*b* positioned on an interior surface 156*b* of a shipping container 162 and sensor(s)/actuator(s) 180 or RFID tag(s) 182 positioned within the interior of the shipping container 162. The modules 140 and 150 may also support other types of communication modalities between one another inside of the shipping container 162; which include, infrared (IR), etc.

Figure 22:
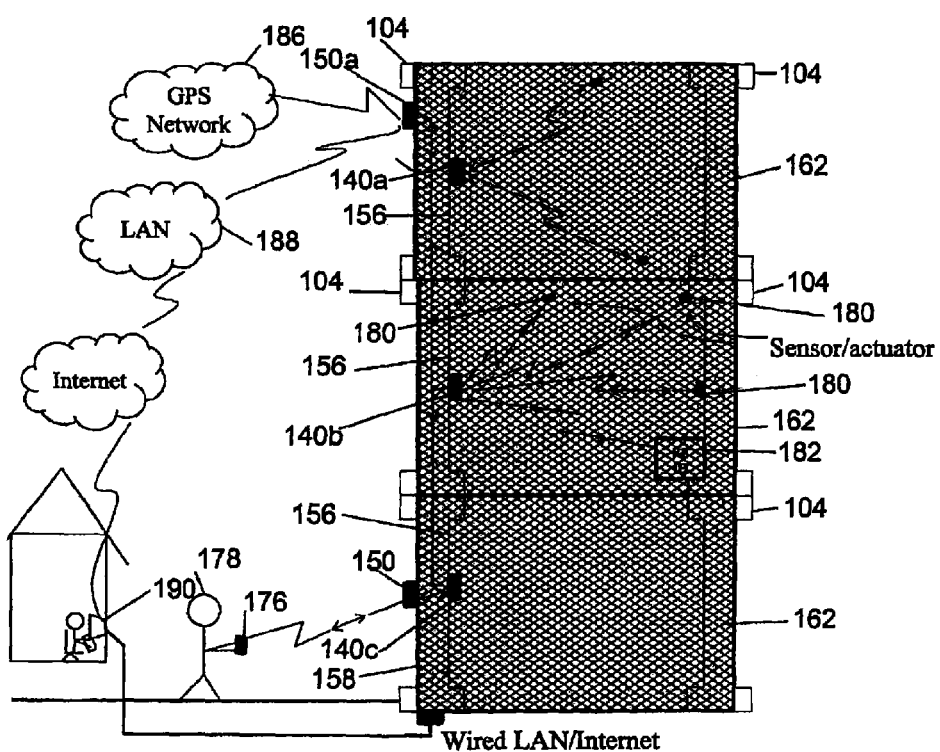
FIG. 22 is a diagrammatic view of three stacked shipping containers showing a communication system according to the instant disclosure.

Referring now to FIG. 22, the communication system shown therein has (1) ultrasonic communication through abutted corner posts 104 between three modules 140*a-c* positioned on interior surfaces 156 of adjacent shipping containers 162, (2) wireless communication between a portable reader 176 held by an individual 178 and a module 150 positioned on an exterior surface 158 of a shipping container 162, (3) wired or wireless communication between modules 140*a-c* positioned on an interior surface 156 of a shipping container 162 and sensor(s)/actuator(s) 180 or RFID tag(s) 182 positioned within the interior of the shipping container 162, (4) at least one module 150*a* positioned on an exterior surface 158 of a shipping container 162 having one or more wireless transceivers for communicating with a GPS network 186, and one or more networks 188 to pass data to a computer 190 using a LAN and/or an Internet. In general, the modules 140 and 150 can be a source, destination, or relay points with relation to a network 188.

Figure 23:
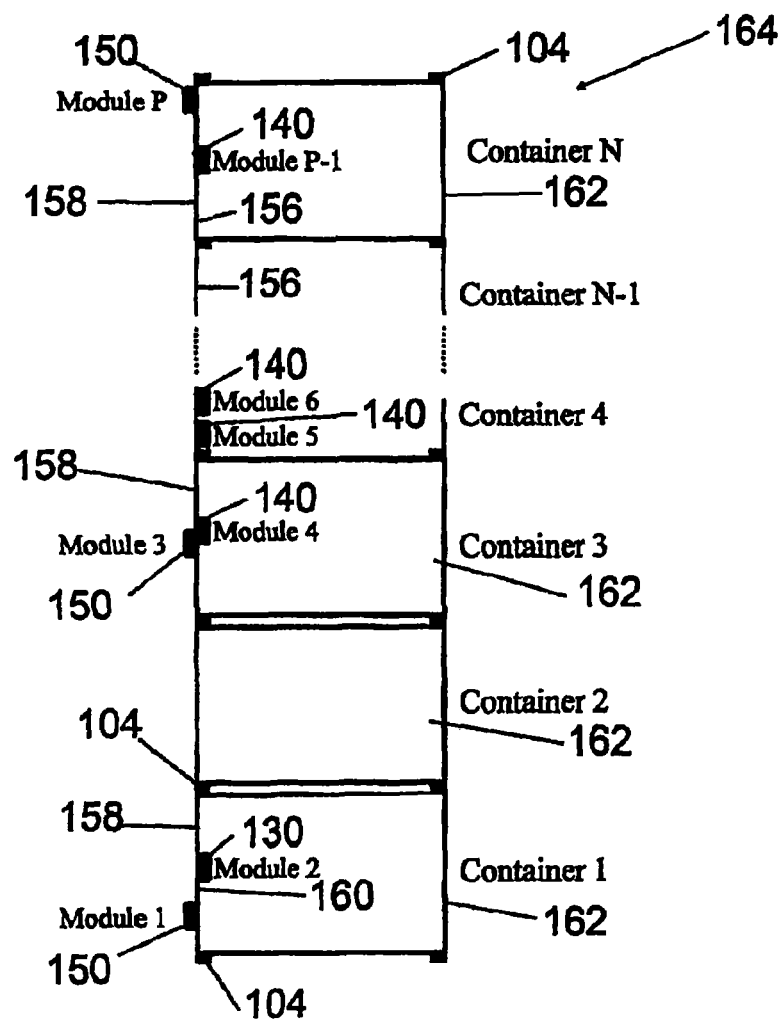
FIG. 23 is another diagrammatic view of an embodiment showing a stack of N shipping containers according to the instant disclosure.

Referring now to FIG. 23, shown therein is a stack 164 of shipping containers 162 having a generic distribution of modules 140 and 150 on abutting shipping containers 162 with each shipping container 162 having zero or more modules 140 and 150, and modules 150 being on interior surfaces 156 and modules 150 being on exterior surfaces 158 of the shipping containers 162.

Figure 24:
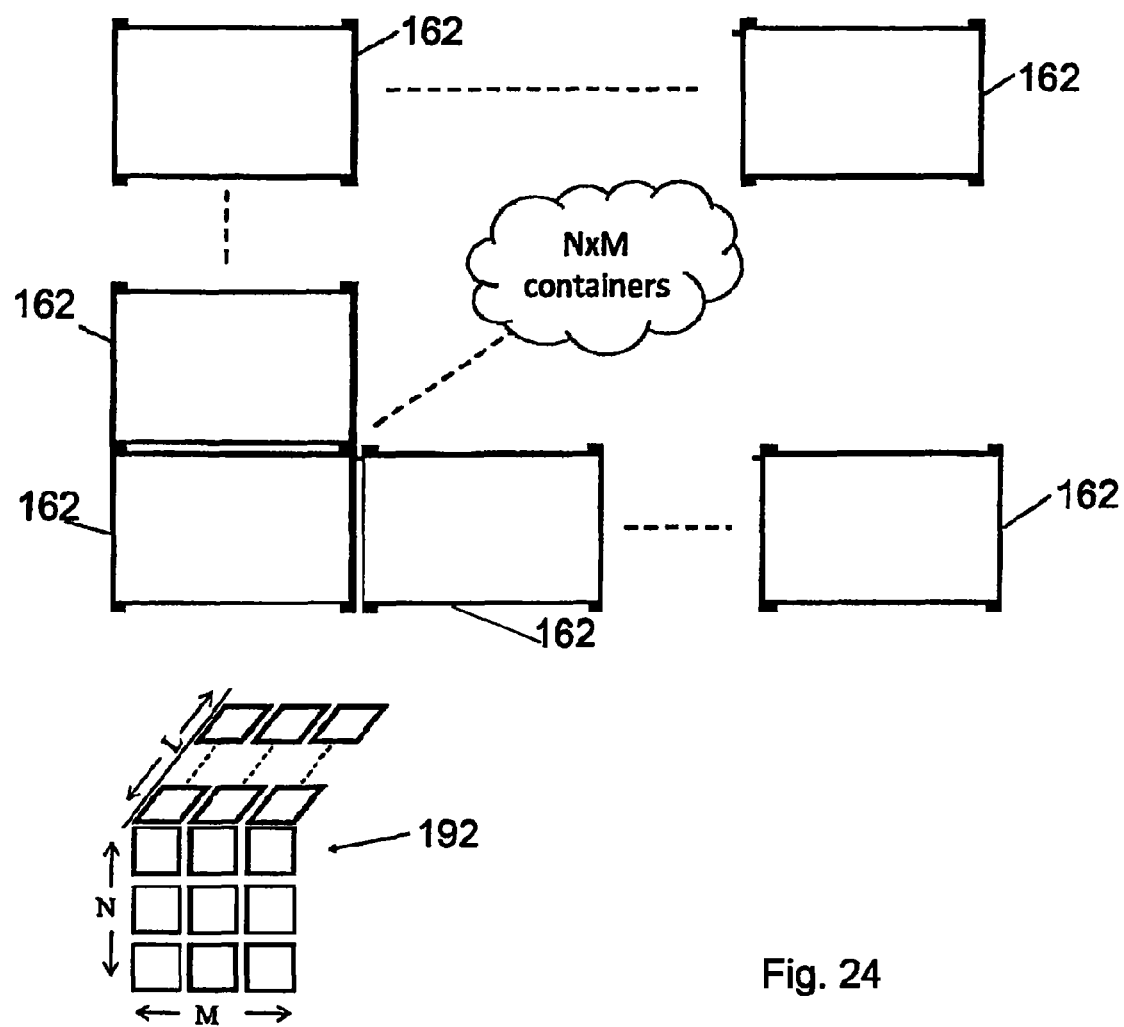
FIG. 24 is a diagrammatic view showing M and L stacks of N shipping containers according to the instant disclosure.

Referring now to FIG. 24, shown therein is a matrix 192 of M×L×N shipping containers 162. The shape of the matrix 192 may be generally, but not necessarily, square or rectangular. Each shipping container 162 may have zero or more communication modules 140 and 150 (not shown). Adjacent structures may or may not be abutted/touching/connected. In summary, two or three dimensional configuration of structures may exist (e.g., shipping containers 162).

Figure 25:
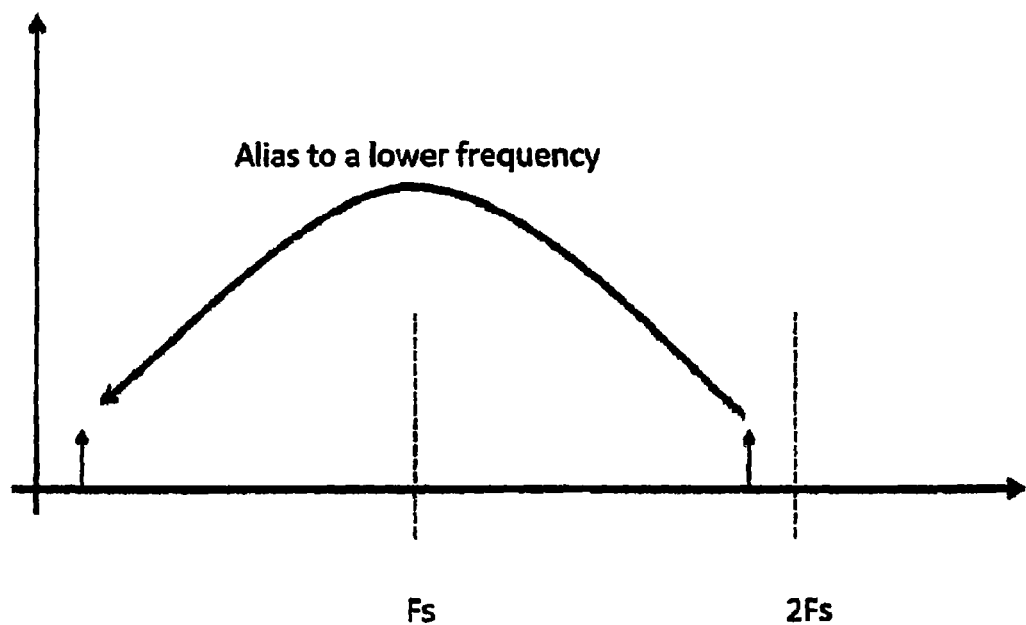
FIG. 25 is a diagram of a sampling plan in the frequency domain according to the instant disclosure.

Referring now to FIG. 25, the signal of interest is assumed to be represented as a spectral line. By sampling at a specific frequency, the signal's spectral line will fold (i.e., intentional alias) to a lower frequency in the spectrum. This concept allows the convenient determination if a signal is on or off by sampling at a low frequency.

Figure 26:
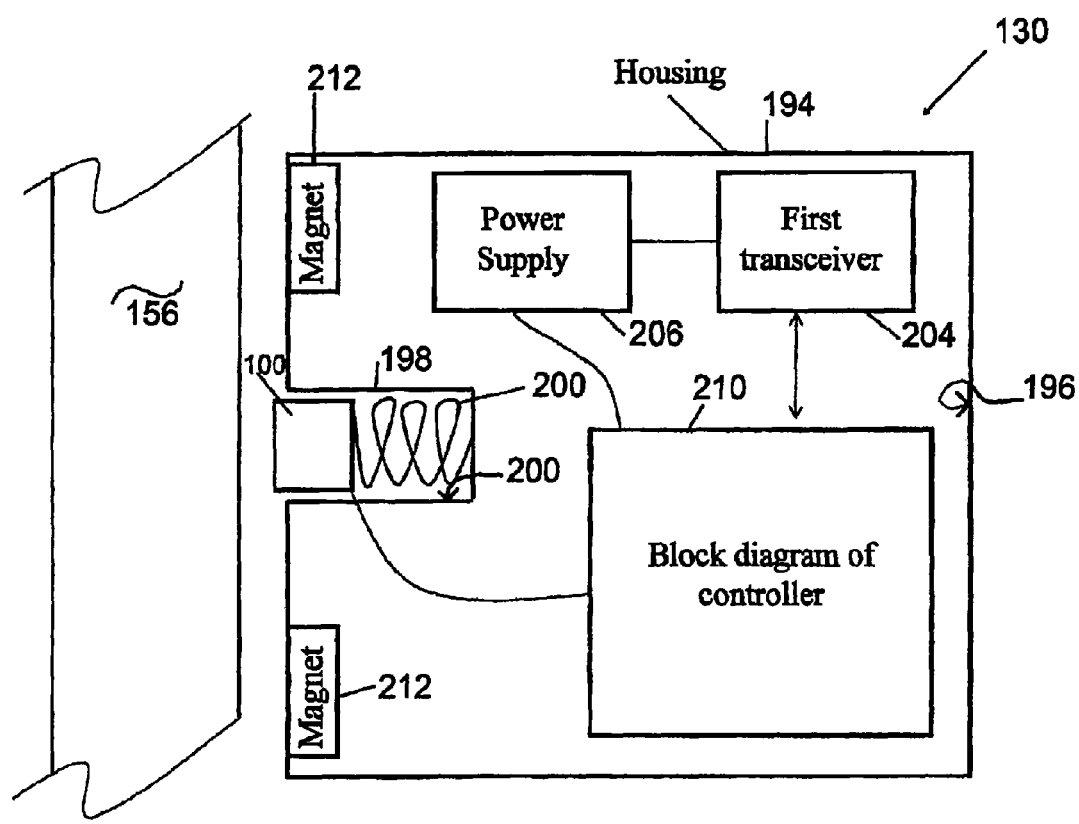
FIG. 26 is a block diagram of an exemplary module according to the instant disclosure.

Shown in FIG. 26 is a block diagram of an exemplary module 140 adapted to be connected to the interior surface 156 of the enclosure 154. The module 140 has a housing 194 defining an interior space 196, and a sleeve 198 defining a bore 200. An ultrasonic transducer 100 is positioned within the bore 200 of the sleeve 198 and is urged out of the bore 200 by a biasing device 202, such as a spring. A first transceiver 204, power supply 206, and controller 210 are preferably positioned within the interior space 196 of the housing 194. The module 140 is also provided with one or more attachment devices 212 which are shown by way of example as magnets for coupling the module 140 to a metal structure. The magnets 212 offer several advantages, such as non-intrusive installation not requiring bolts, welding, or glue while being relatively easy to install, maintain, and/or remove. However, it should be understood that the module 140 could be designed to use intrusive coupling mechanisms, such as bolts, welding or glue(s). In the example shown in FIG. 26, magnets enable the module 140 to be instantly mounted/dismounted onto a metal surface without compromising/modifying the surface. When mounted, the face of the transducer 100 can be held in compression on the surface by the force provided by the biasing device 202, such as a compressed spring.

The housing 194 is preferably constructed of a rugged, non-corrosive material such as plastic that may also be pervious to RF.

The magnet-based mounting system of the module depicted in FIG. 26 enables modules to be mounted/dismounted quickly from a surface and without compromising the surface. A module may be mounted/dismounted on the outside of numerous distinct shipping containers by a single operator within a short time span to query information from modules mounted on the inside of various distinct shipping containers that are either directly or indirectly in contact with the shipping container on which the operator mounts the external module. The description of a magnet-based quick mount/dismount module does not preclude the use and installation of more permanently mounted modules via bolts, epoxies, or welding. The power supply (which may include batteries) of modules that are used in this manner by an operator may be re-charged and/or replaced periodically.

The instant disclosure describes the design of an MFSK communication system based on ultrasonic signals transmitted through steel shipping container corner posts via conformally mounted low cost transducers. We have demonstrated the ability to reliably encode and transmit a word of data that is encoded as an MFSK symbol. Experiments conducted show that inexpensive transducers are capable of both transmitting and receiving ultrasonic signals through steel with a relatively high signal-to-noise ratio and low transmit power. An exemplary embodiment of a system according to the instant disclosure uses inexpensive parts to build a working receiver with a data rate of about 800 bps. Low-power aspects are further enhanced by leveraging software defined radio techniques to implement a bandpass sampling strategy (i.e., undersampling). Currently, our data transmission is limited by how quickly the low-cost F2407A can perform an FFT. With an upgraded DSP chip, the potential to be able to receive data more quickly will be limited only by the intersymbol interference (ISI) of the channel. Future developments may include specific MFSK symbol encodings as well as communication protocols. A complete transmitter/receiver module may also be implemented that is capable of sensing and storing data from an array of sensors.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed and claimed herein.

REFERENCES

[1] H. Tomlinson, J. Daton, E. Nieters, and F. Ross, "Ultrasound communication system and related methods," US Patent Application No. US 2007/0167133 A1, 2007.
[2] H. Haynes and M. Akeman, "Final report, ultrasonic communication project, phase 1, fy 1999," Engineering Technology Division, Oak Ridge National Laboratory, Tech. Rep., June 2000.
[3] L. R. LeBlanc and P.-P. Beaujean, "Multi-frequency shift key and differential phase shift key for acoustic modem," June 1996, pp. 160-166.
[4] D. Ensminger, Ultrasonics, 2nd ed. Marcel Dekker, 1988.
[5] K. A. Company, "Ultrasonic transducers part number: 255-400er25-rox, 255-400et25-rox," Data Sheet, Kobitone Audio Company, Tech. Rep., 2007.
[6] C. Luo, M. Medard, and L. Zheng, "On approaching wideband capacity using multitonefsk," vol. 23, no. 9, pp. 1830-1838, September 2005.
[7] D. Akos, M. Stockmaster, J. Tsui, and J. Caschera, "Direct bandpass sampling of multiple distinct rf signals," in IEEE Transactions on Communications, vol. 47, no. 7, July 1999, pp. 983-988.
[8] C. Tseng and S. Chou, "Direct downconversion of multiband rf signals using bandpass sampling," in IEEE Transactions on Wireless Communications, vol. 5, no. 1, January 2006, pp. 72-76.
[9] R. Vaughan, N. Scott, and D. White, "The theory of bandpass sampling," in IEEE Transactions on Signal Processing, vol. 39, no. 9, September 1991, pp. 1973-1984.

[10] N. Wong and T. Ng, "An efficient algorithm for downconverting multiple bandpass signals using bandpass sampling," in IEEE International Symposium on Circuits and Systems, vol. 3, June 2001, pp. 910-914.
[11] M. Yeary, J. Meier, R. Kelley, and R. Palmer, "Compact digital receiver development for radar based remote sensing," in IEEE International Instrumentation and Measurement Technology Conference, May, 2008.
[12] R. Bradbeer, S. Harrold, F. Nickols, and L. Yeung, "An underwater robot for pipe inspection," in Proceedings of the Fourth Annual Conference on Mechatronics and Machine Vision in Practice, September 1997, pp. 152-156.
[13] E. Ersagun and A. Yilmaz, "Ultrasonic communication in wireless sensor networks," in IEEE 16th Signal Processing, Communication and Applications Conference, April 2008, pp. 1-4.
[14] R. Primerano, M. Kam, and K. Dandekar, "High bit rate ultrasonic communication through metal channels," in 43rd Annual Conference on Information Sciences and Systems, March 2009, pp. 902-906.
[15] G. J. Saulnier, H. A. Scarton, A. J. Gavens, D. A. Shoudy, T. L. Murphy, M. Wetzel, S. Bard, S. Roa-Prada, and P. Das, "Throughwall communication of low-rate digital data using ultrasound," in IEEE Ultrasonics Symposium, October 2006, pp. 1385-1389.
[16] D. Shoudy, G. Saulnier, H. Scarton, P. Das, S. Roa-Prada, J. Ashdown, and A. Gavens, "An ultrasonic through-wall communication system with power harvesting," in IEEE Ultrasonics Symposium, October 2007, pp. 1848-1853.

What is claimed is:

1. An ultrasonic communication system, comprising:
a first enclosure having at least one first steel corner post comprising at least one first channel capable of transmitting modulated ultrasonic waves;
one or more first modules comprising an ultrasonic transceiver positioned onto the at least one first channel;
a second enclosure having at least one second steel corner post comprising at least one second channel capable of transmitting modulated ultrasonic waves;
one or more second modules comprising an ultrasonic transceiver positioned onto the at least one second channel; and
wherein the first enclosure and the second enclosure are positioned in an abutting interface connecting the at least one first channel of the at least one first steel corner post and the at least one second channel of the at least one second steel corner post, and wherein the first module and the second module communicate using the at least one first channel and at least one second channel to transmit modulated ultrasonic waves in a frequency range between near 280 kHz and approximately 330 kHz.

2. The ultrasonic communication system of claim 1, wherein the first enclosure and the second enclosure comprise shipping containers.

3. The ultrasonic communication system of claim 1, wherein the first enclosure and the second enclosure are pressurized.

4. A method of ultrasonic communication, comprising the steps of:
providing (1) a first enclosure having at least a first steel corner post comprising at least one first channel capable of transmitting an ultrasonic modulated wave and at least one first module comprising an ultrasonic transceiver positioned on the at least one first channel; and
(2) at least one second enclosure having at least a second steel corner post comprising at least one second channel capable of transmitting modulated ultrasonic waves and at least one second module comprising an ultrasonic transceiver positioned on the at least one second channel, and wherein the first enclosure and the at least one second enclosure are positioned such that an end of the first steel corner post abuts an end of the second steel corner enabling the at least one first module and the at least one second module to communicate ultrasonically via the at least one first channel and at least one second channel; and actuating the at least one first module causing transmission of an ultrasonic signal from the at least one first module to the at least one second module via the at least one first channel and the at least one second channel, wherein the transmission occurs via modulated ultrasonic waves in a frequency range between near 280 kHz and approximately 330 kHz.

5. The method of claim 4, wherein the at least one first module comprises a radiofrequency transceiver.

6. The method of claim 4, wherein the at least one first module includes one or more magnets for positioning the at least one first module onto an internal surface of the first enclosure.

7. The method of claim 4, wherein the first enclosure and the at least one second enclosure are pressurized.

8. The method of claim 4, wherein the first enclosure and the at least one second enclosure are shipping containers.

* * * * *